United States Patent
Tasaka et al.

(10) Patent No.: US 8,264,926 B2
(45) Date of Patent: Sep. 11, 2012

(54) INFORMATION RECORDING MEDIUM WITH POWER CALIBRATION AREA

(75) Inventors: Shuichi Tasaka, Takarazuka (JP);
Hiroyuki Yamaguchi, Nishinomiya (JP); Takashi Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 823 days.

(21) Appl. No.: 10/566,460

(22) PCT Filed: Dec. 24, 2004

(86) PCT No.: PCT/JP2004/019335
§ 371 (c)(1),
(2), (4) Date: Jan. 30, 2006

(87) PCT Pub. No.: WO2005/064599
PCT Pub. Date: Jul. 14, 2005

(65) Prior Publication Data
US 2008/0037378 A1    Feb. 14, 2008

(30) Foreign Application Priority Data

| Dec. 26, 2003 | (JP) | 2003-434840 |
|---|---|---|
| Jul. 16, 2004 | (JP) | 2004-210635 |
| Oct. 22, 2004 | (JP) | 2004-307942 |

(51) Int. Cl.
*G11B 7/00* (2006.01)
(52) U.S. Cl. .................. 369/47.53; 369/53.31
(58) Field of Classification Search ............... 369/47.53, 369/53.31
See application file for complete search history.

(56) References Cited

U.S. PATENT DOCUMENTS

| 5,289,450 | A | 2/1994 | Mizumoto et al. |
| 5,703,841 | A * | 12/1997 | Hiroki ................ 369/13.24 |
| 6,061,316 | A | 5/2000 | Nakamura et al. |
| 6,188,653 | B1 | 2/2001 | Nagano et al. |
| 6,639,890 | B1 | 10/2003 | Miura et al. |
| 6,724,705 | B1 | 4/2004 | Ko et al. |
| 6,751,173 | B1 | 6/2004 | Maeda |
| 6,845,071 | B2 | 1/2005 | Shoji et al. |

(Continued)

FOREIGN PATENT DOCUMENTS

CN    1140897    12/1998

(Continued)

OTHER PUBLICATIONS

DVD+R 4.7 Gbytes Basic Format Specifications version 1.2, System Description, Jul. 2003.*

*Primary Examiner* — Latanya Bibbins
(74) *Attorney, Agent, or Firm* — Hamre, Schumann, Mueller & Larson, P.C.

(57) ABSTRACT

The invention provides an information recording medium including highly reliable power calibration areas, as well as an information recording and reproducing device utilizing it. The medium is an information recording medium having a recording layer including a data recordable area 50 for recording user information signals, a lead-in area provided on the inner periphery of the data recordable area 50, an inner power calibration area provided further on the inside of the lead-in area for recording test recording patterns, and a recording management area for recording management information related to the inner power calibration area. An outer power calibration area 70 is provided on the outer periphery of the final point of recording of the user information signal on the recording layer.

22 Claims, 17 Drawing Sheets

U.S. PATENT DOCUMENTS

| | | |
|---|---|---|
| 6,963,525 B2 | 11/2005 | Honda |
| 7,184,377 B2 * | 2/2007 | Ito et al. .................... 369/47.14 |
| 2002/0054548 A1 | 5/2002 | Tateishi |
| 2002/0154585 A1 * | 10/2002 | Adachi ........................ 369/47.3 |
| 2002/0176971 A1 | 11/2002 | Ohsawa et al. |
| 2002/0181376 A1 * | 12/2002 | Acker ........................ 369/59.25 |
| 2003/0185120 A1 * | 10/2003 | Morozumi et al. ........ 369/47.52 |
| 2004/0017751 A1 | 1/2004 | Matsumoto |
| 2004/0076094 A1 * | 4/2004 | Toshiaki et al. ............ 369/47.53 |
| 2005/0078578 A1 | 4/2005 | Sasaki |
| 2005/0094518 A1 | 5/2005 | Ueki |
| 2005/0163029 A1 | 7/2005 | Tobita |
| 2005/0226116 A1 | 10/2005 | Kubo et al. |
| 2008/0013425 A1 * | 1/2008 | Lee et al. .................. 369/47.53 |

FOREIGN PATENT DOCUMENTS

| | | |
|---|---|---|
| CN | 1180406 | 10/2002 |
| CN | 1388525 A | 1/2003 |
| EP | 1 367 568 | 12/2003 |
| JP | 5-36074 | 2/1993 |
| JP | 6-36474 | 2/1994 |
| JP | 8-203081 | 8/1996 |
| JP | 10-154331 | 6/1998 |
| JP | 2000-20956 | 1/2000 |
| JP | 2000-36161 | 2/2000 |
| JP | 2000-311346 | 11/2000 |
| JP | 2000-311353 | 11/2000 |
| JP | 2001-331940 | 11/2001 |
| JP | 2002-150607 | 5/2002 |
| JP | 2002-358648 | 12/2002 |
| JP | 2003-203342 | 7/2003 |
| JP | 2003-203344 | 7/2003 |
| JP | 2003-257032 | 9/2003 |
| JP | 2003-281724 | 10/2003 |
| JP | 2003-296943 | 10/2003 |
| JP | 2005-63628 | 3/2005 |
| JP | 2005-158148 | 6/2005 |
| WO | 03/046898 | 6/2003 |

* cited by examiner

| Case | First recording drive | Second recording drive | Recordable area |
|---|---|---|---|
| 1 | Use Outer PCA | Use Outer PCA | Modify using first recording drive |
| 2 | Use Outer PCA | Use only Inner PCA | Modify using first recording drive |
| 3 | Use only Inner PCA | Use Outer PCA | Modify using second recording drive |
| 4 | Use only Inner PCA | Use only Inner PCA | Same as LPP field |

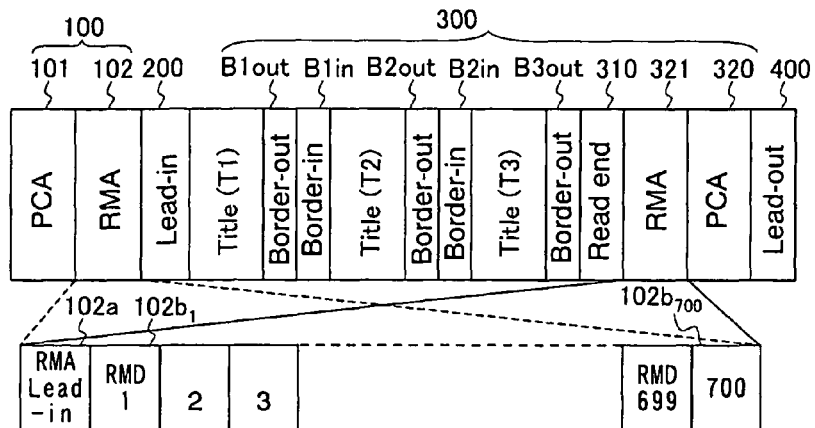

INFORMATION RECORDING MEDIUM WITH POWER CALIBRATION AREA

TECHNICAL FIELD

The present invention relates to an information recording medium, such as an optical disk, and to an information recording and reproducing device performing recording and reproduction therefrom and, in particular, to an information recording medium with a write power calibration area and to an information recording and reproducing device utilizing it.

BACKGROUND ART

Information recording media capable of optically recording digital information signals on information layers and reproducing information signals recorded on information layers with recording marks or recording pits (hereinafter called recording marks) have been gaining popularity due to the high level of quality and retrievability of the recording marks. Additionally, in recent years, DVDs (digital versatile disks) have been proposed as high density recording media that increase the volume of information that can be recorded on a single disk so as to better meet the demands of recording moving images and other high-volume information signals, and have become popular in that they meet the market demands. In addition, recordable DVDs (hereinafter called "writable DVD") also are expected to provide increased reproduction and recording speeds, in the same manner as read-only media (e.g. CD-ROMs, etc.) containing, e.g., pre-recorded computer software programs. Incidentally, the constant linear velocity (CLV) system is advantageous in terms of increasing the density of recording and recording systems (hereinafter called the "CLV system" or the "CLV recording system," including the ZCLV system, etc.) based on the CLV system have been developed and used in recording and reproducing devices used for recording and reproduction of writable DVDs.

On the other hand, as described above, writable DVDs are intended to increase the density of recording so as to record high-volume information signals, and, due to the higher recording density, there is a demand for maintaining records of recording information, such as write power and recording speed, etc. recommended by manufacturers of writable DVDs, information on the recording and reproducing devices used for recording on writable DVDs and/or compatibility of recording and reproducing devices with writable DVDs during recording, etc. For this reason, on the inner periphery of a lead-in area, which is located on the inner periphery of a data recordable area (Data Recordable Area), there is provided a recording management area (Recording Management Area), where records of recording management information are maintained, and a power calibration area (Power Calibration Area), which is used for keeping records of the irradiated laser power and recording speed, etc. used for recording in the data recordable area. The power calibration area is provided on the inside of the recording management area and, when the recording speed reaches a target value, it is used to make a record of information such as the laser power used to irradiate the information layer at the recording speed. This information is preserved as history for the purpose of learning about the irradiation power corresponding to the recording speed used when recording is resumed.

As described above, recording and reproducing devices perform recording using the CLV system and therefore, when recording is performed closer to the center, the rotational speed of the spindle motor rotating a writable DVD is increased. Thus, for example, while records of recording history information can be made at 4× recording speed in the power calibration area provided on the innermost periphery of a writable DVD, increasing the speed to 8× or 16× brings the rotation of the spindle motor to its limit and it becomes impossible to catch up and make records of recording history in the power calibration area.

Thus, taking into account the fact that merely providing the power calibration area on the innermost periphery is not sufficient to handle the demand for increased speed, Non-Patent Document 1 disclosed a configuration in which a new area, i.e. an outer drive area (Outer Drive Area), was provided on the outer periphery of the lead-out area as an area for maintaining records of recording history information that could not be handled in the inner disk test zone (Inner Disc Test Zone), with records of recording history information that could not be handled at high recording speeds kept in the outer disk test zone (Outer Disc Test Zone) of the outer drive area.

For example, FIG. 17 and FIG. 18 provide conceptual cross-sectional views of a conventional optical disk, with FIG. 17 depicting a recording area on the inner periphery of a DVD-R, and FIG. 18 showing a conceptual diagram of a recording area on the outer periphery of a DVD+RW. In the case of a DVD-R, an RMA area and an OPC area are provided further inward from the lead-in area. At the start of data recording, an information recording and reproducing device performs optimum write power calibration (OPC, Optimum Power Calibration) and, based on the calibration, determines the write power of the semiconductor laser. Here, "OPC" is an operation, wherein a predetermined test recording mark is written on an optical disk and the write power of the semiconductor laser is calibrated based on the beta value of the analog signal reproduced from the test recording mark. "OPC information" refers to OPC-related information including write strategies and write power conditions used during OPC. In addition, in the case of DVD-RAM and DVD+RW, OPC areas called disk test zones are provided on the inner periphery and on the outer periphery, but in FIG. 18, such an area is provided only on the outer periphery. After recording the entire data volume, the data recordable area reaches a radius of up to 58 mm, after which the lead-out area is recorded to a radius of 58.0~58.05 mm and the disk test zone is recorded to a radius of 58.1~58.3 mm.

Incidentally, substrates that transmit light used for recording and reproduction, and not only those used for DVDs, are formed by injection molding using polycarbonate and other resins. During such injection molding, a nozzle used for resin injection is placed near the inner periphery so as to allow the resin to spread across the entire surface of the mold. However, because the surface of the mold has a complicated geometry with tracks and embossing, etc., even though the process is designed to allow the resin to spread across the entire surface of the mold, the amount of resin supplied to the inner and outer portions of the substrate varies, resulting in inferior molding accuracy in the outer periphery portion. As a result, the molding accuracy of tracks and/or planar accuracy in the outer periphery portion of a disk is inferior in comparison with the inner periphery portion.

In addition, it is well known that in the past, the main component of the information layer of a writable DVD was an inorganic material in case of an erasable disk, and an organic dye in case of a write-once disk. Sputtering or vacuum vapor deposition and other so-called gas-phase deposition techniques are used for forming inorganic material-based information layers, and the method generally used for organic dyes is the so-called spin-coating technique in which a solution of an organic dye is applied to a rotating substrate in a dropwise manner. Because the spin-coating technique makes use of centrifugal forces generated by the rotation of the substrate, the organic dye solution is applied in a dropwise manner to the inner periphery of a substrate. For this reason, in write-once DVDs (so-called DVD-R, DVD+R) with information layers formed by spin-coating using an organic dye solution, the information layer at the outer periphery tends to have an insufficient amount of dye solution in comparison with the information layer on the inner periphery, resulting in inferior information layer quality.

Furthermore, the flatness of writable DVDs and other information recording media utilizing substrates produced by resin molding is lower than that of inorganic materials, such as glass. This creates a phenomenon called "surface wobbling", wherein the surface of the disk moves up and down in the direction of the axis of rotation when the disk rotates. The surface wobbling phenomenon becomes more pronounced closer to the outer periphery and, in addition, as the speed of rotation becomes higher. Therefore, when information is recorded on the outer periphery at high speeds, there is a chance that surface wobbling may present a problem.

As explained above, the inner periphery is highly suitable as an area for keeping records of important information, while areas closer to the outer periphery are inferior from the standpoint of reliability. Therefore, the problem with the conventional configuration wherein, as disclosed in the above-described Non-Patent Document 1, an outer disk test zone (Outer Disc Test Zone) is newly provided on the outermost periphery of a writable DVD for recording information on the irradiation power corresponding to the recording speed, etc. (recording history information), is that it is impossible to ensure the reliability of such information.

In addition, the information area (Information Area), wherein an information signal can be recorded in a writable DVD, typically includes a power calibration area, a recording management area, a lead-in area, a data recordable area, and a lead-out area, and the problem with the conventional configuration is that it requires expanding the extent of the information area so as to compensate for recording past the outer periphery of the lead-out area.

[Non-Patent Document 1]
"DVD+R 4.7 Gbytes Basic Format Specifications version 1.2" (issued July 2003) (Page 48: 16.1 Physical Sector Numbers (PSNs) FIG. 22, Page 49: Table 7, see "Outer Disk Test Zone" in the "Outer Drive Area" column; Page 60: 21.3 Outer Disc Test Zone; and Pages 117~119: Annex H Optimum Power Control and Recording Conditions).

DISCLOSURE OF INVENTION

It is an object of the present invention to address the essential problems of such a conventional configuration and provide an information recording medium including a power calibration area of high reliability.

In order to attain the above-mentioned object, the inventive information recording medium is configured as an information recording medium having a recording layer including a data recordable area for recording user information signals, a lead-in area provided on the inner periphery of the data recordable area, an inner power calibration area for recording test recording patterns, provided further on the inside of the lead-in area, and a recording management area for recording recording management information related to the inner power calibration area, wherein an outer power calibration area is provided on the outer periphery of the final point of recording of the user information signal on the recording layer.

By providing a outer power calibration area on the outer periphery of the final point of recording of the user information signal on the recording layer, the inventive information recording medium enables power calibration in an area with better mechanical properties, such as surface wobbling, etc., than a recording medium provided with a power calibration area on the outer periphery of the lead-out area (the outermost periphery of an optical disk) in the conventional manner. As a result, the information recording and reproducing device has the advantage of being able to determine the optimum write power reliably and within a short period of time.

BRIEF DESCRIPTION OF DRAWINGS

FIG. 3 is a conceptual diagram of various choices in PCA recording.

FIG. 16 is a conceptual diagram of the logical format of a DVD-R.

BEST MODE FOR CARRYING OUT THE INVENTION

Figure 1:
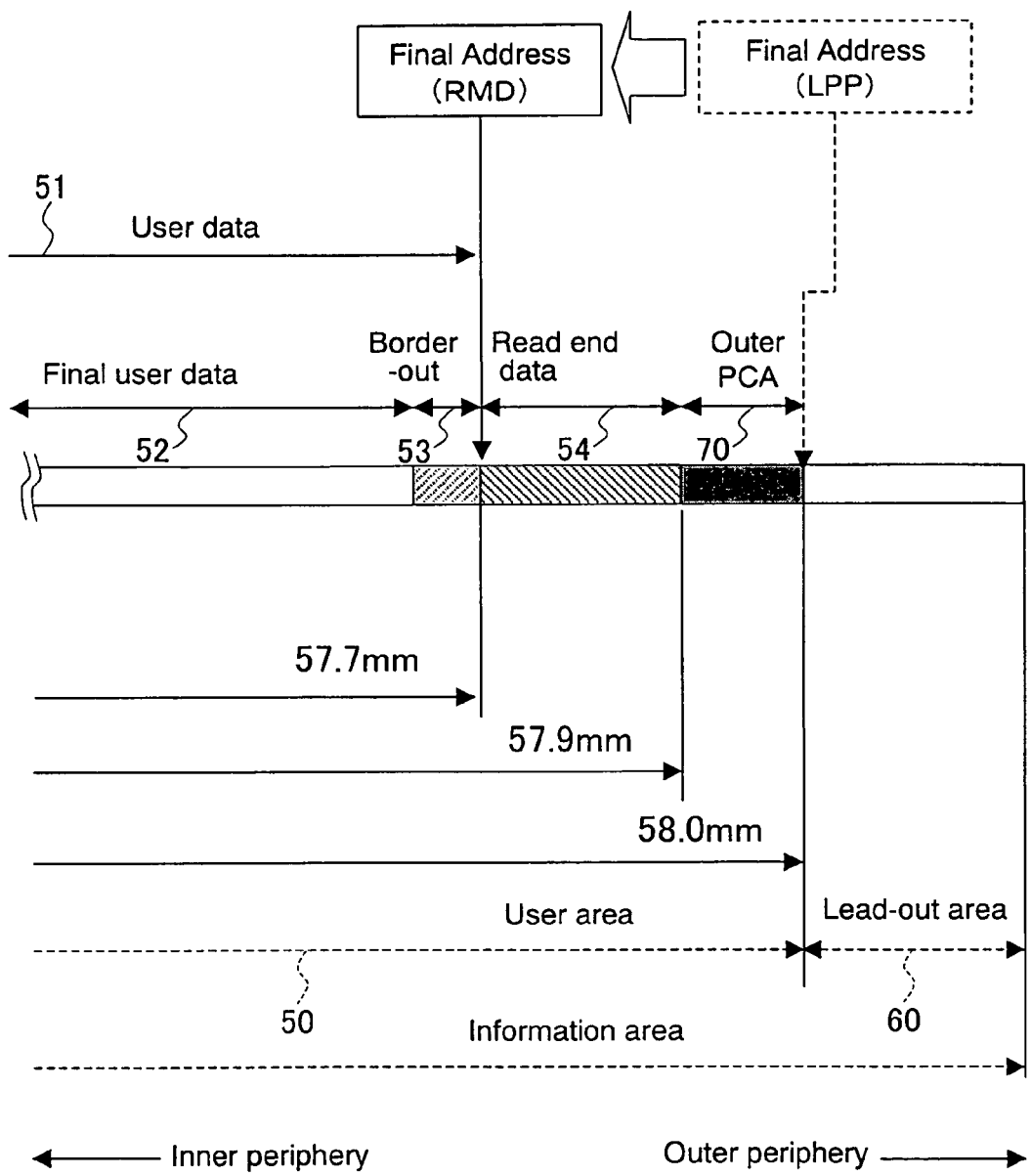
FIG. 1 is a schematic cross-sectional view showing the relationship between the outer PCA and the writable area on an information recording medium according to an embodiment of the present invention.

The inventive information recording medium is an information recording medium having a recording layer including a data recordable area for recording user information signals, a lead-in area provided on the inner periphery of the data recordable area, an inner power calibration area provided further on the inside of the lead-in area for recording test recording patterns, and a recording management area for recording recording management information related to the inner power calibration area, wherein an outer power calibration area is provided on the outer periphery of the final point of recording of the user information signal on the recording layer.

In the information recording medium of the above configuration, a configuration also may be used in which the recording layer further includes a lead-out area and the outer power calibration area is provided between the data recordable area and the lead-out area. Otherwise, a configuration may be used in which the outer power calibration area forms part of the data recordable area.

In the information recording medium of the above configuration, a configuration also may be used in which there are provided a plurality of recording layers, recording of a user information signal on one recording layer out of two adjacently stacked recording layers among the plurality of recording layers is performed from the inner periphery to the outer periphery of the information recording medium and recording of a user information signal on the other recording layer of the two recording layers is performed from the outer periphery to the inner periphery of the information recording medium, and wherein, in one recording layer, the above-mentioned outer power configuration area is provided on the outer periphery of the final point of recording of the user information signal and, in the other recording layer, the above-mentioned outer power configuration area is provided on the outer periphery of the starting point of recording of the user information signal.

In the information recording medium of the above configuration, a configuration also may be used in which there are provided a plurality of recording layers, and recording of a user information signal on all the plurality of recording layers is performed from the inner periphery to the outer periphery of the information recording medium and the outer power configuration area is provided on the outer periphery of the final point of recording of the user information signal on each of the plurality of recording layers.

In the above-described information recording medium, it is preferable to use a configuration in which in an nth inner power calibration area, an (n+1)th inner power calibration area, an nth outer power calibration area, and an (n+1)th outer power calibration area provided, respectively, on an adjacently stacked nth recording layer and an (n+1)th recording layer, test recording execution areas provided in the respective power calibration areas are provided such that they do not mutually overlap in the direction of stacking of the recording layers.

In the above-described information recording medium, it is preferable that the direction of test recording performed for power calibration in the nth inner power calibration area and in the nth outer power calibration area is opposite to the direction of recording of the user information signal on the nth recording layer. Thus, the "direction of recording of the user information signal on the recording layer" is either from the inner periphery to the outer periphery, or from the outer periphery to the inner periphery.

In the above-described information recording medium, an nth outer power calibration area and an (n+1)th outer power calibration area are provided, respectively, in an adjacently stacked nth recording layer and (n+1)th recording layer, with an nth middle area provided on the inner periphery of the nth outer power calibration area in the nth recording layer, and an (n+1)th middle area provided on the inner periphery of the (n+1)th outer power calibration area in the (n+1)th recording layer.

Furthermore, in the information recording medium of the above configuration, in each adjacently stacked nth recording layer and (n+1)th recording layer, the nth middle area and the (n+1)th middle area, as well as the nth power calibration area and the (n+1)th power calibration area, are arranged by shifting them, in their entirety, towards the inner periphery, such that at least a portion of the nth middle area and the (n+1)th middle area, as well as the nth power calibration area and the (n+1)th power calibration area, is positioned on the inside of the outermost location that permits recording user information signals.

In the information recording medium of the above configuration, the outer power calibration area preferably is provided in a circular fashion at a distance of at least 0.2 mm on the outside from the outermost recordable location in the data recordable area.

In the information recording medium of the above configuration, recording management information related to the outer power calibration area preferably also is recorded in the recording management area.

In the information recording medium of the above configuration, it is preferable to use a configuration, wherein an outer recording management area used for recording recording management information related to the outer power calibration area is provided on the outside of the data recordable area.

In the information recording medium of the above configuration, a test recording pattern preferably is recorded in the outer power calibration area when the data recording speed in the data recordable area is a predetermined speed or higher. Otherwise, in the information recording medium of the above configuration, a test recording pattern also preferably is recorded in the outer power calibration area when the data recording speed in the data recordable area exceeds the recording speed at which recording was performed in the data recordable area in the past. Furthermore, if the information recording medium has a plurality of recording layers, the expression "the speed of recording in the data recordable area", as used above, refers to the recording speed in the data recordable area located in the same recording layer as the outer power calibration area.

In addition, the inventive information recording and reproducing device is an information recording and reproducing device for recording a desired user information signal in the data recordable area of any of the above information recording media, configured to include a rotary drive unit that rotates the information medium, an optical pickup that performs information signal recording or information signal reproduction by irradiating the information recording medium with light, and a calibration control unit that performs calibration of irradiation power using the optical pickup by moving the optical pickup at least to either one of the inner and outer power calibration areas of the information recording medium.

In the above configuration, there further is provided a rotation control unit that controls the speed of rotation of the information recording medium by the rotary drive unit, with the calibration control unit preferably acquiring information on the rotational speed of the information recording medium from the rotation control unit and, depending on the acquired rotational speed information, determining whether to perform calibration of the irradiation power using the optical pickup in either one of the inner and outer power calibration areas.

In the above configuration, the calibration control unit preferably carries out irradiation power calibration using the optical pickup in the outer power calibration area when the speed represented by the rotational speed information exceeds a predetermined speed.

The above configuration preferably further includes means for copying the newest test recording pattern from among the test recording patterns stored in the inner power calibration area to the outer power calibration area whenever a recording operation begins.

The above configuration preferably further includes means for erasing test recording patterns corresponding to the data to be erased among the test recording patterns recorded in the outer power calibration area when data is erased from the data recordable area.

In the above configuration, information representing the extent of the writable area of the data recordable area preferably is contained in the recording management area of the information recording medium, and the information recording and reproducing device further includes means for modifying the information representing the extent of the writable area of the data recordable area so as to move the outermost periphery of the writable area on the information recording medium toward the inner periphery.

In addition, the inventive information recording and reproducing device is an information recording and reproducing device for recording desired user information signals in the data recordable area of an information recording medium provided with the above-described plurality of recording layers and may be configured to include a rotary drive unit that rotates the information recording medium, an optical pickup that performs information signal recording or information signal reproduction on a recording layer by irradiating any of the recording layers among the plurality of recording layers provided in the information recording medium with light, and a calibration control unit that performs calibration of irradiation power using the optical pickup by moving the optical pickup at least to either one of the inner and outer power calibration areas of the information recording medium in the recording layer where one intends to perform recording or reproduction of an information signal.

More specific embodiments of the inventive information recording medium and information recording and reproducing device are explained hereinbelow.

(Embodiment 1)

Recent years have witnessed remarkable progress in optical information recording technology, in other words, the technology of data recording on recordable optical disks. Various optical recording and reproducing devices, i.e. optical disk recording and reproducing devices, have been developed in the process. In particular, devices such as DVD-RAM drives, which are utilized as external recording devices for computers, already have started gaining widespread popularity.

Recordable optical disks are divided into write-once optical disks and rewritable optical disks. A write-once optical disk is an optical disk on which data can be recorded only once. Write-once optical disks include CD-R (Recordable), DVD-R, and DVD+R.

The formation of recording marks on a write-once optical disk is carried out in the following manner. The recording layer contains an organic dye. The organic dye decomposes when irradiated with a laser of a predetermined power. As a result, its optical reflectance, in particular, is decreased. By doing so, the portion of the recording layer subjected to the laser irradiation forms a recording mark.

The recording of data on a write-once optical disk is limited to a single session for the following reasons. When recording marks are made, a large amount of heat is generated in the laser-irradiated portion of the recording layer. The heat causes deformations in the surrounding resin, etc. Since the deformations are irreversible, it is impossible to return to the state that existed prior to laser irradiation. For this reason, recording of data on write-once optical disks is limited to a single session.

A rewritable optical disk is an optical disk that can be recorded several times by rewriting data. Rewritable optical disks include CD-RW (Re-Writable), DVD-RAM, DVD-RW, DVD+RW, etc.

The formation of recording marks on a rewritable optical disk utilizing the phase-change recording system is carried out in the following manner. The recording layer contains an alloy having two types of solid phases, i.e. a crystalline phase and an amorphous phase. Typically, it is designed such that the optical reflectance of the recording layer becomes high during the crystalline phase and low during the amorphous phase. Therefore, amorphous-phase portions of the recording layer form recording marks. The formation of recording marks, in other words, the transition from the crystalline phase to the amorphous phase, is carried out in the following manner. The recording layer is subjected to pulsed irradiation with a laser of a relatively high power. By doing so, a narrow region of the recording layer instantaneously is heated to a temperature above the melting point and then immediately rapidly cooled to a temperature below the glass transition point. As a result, transition to the amorphous phase takes place in a narrow region of the recording layer.

Furthermore, existing recording marks on a rewritable optical disk based on the phase-change recording system can be erased in the following manner. As explained above, recording marks are constituted by amorphous-phase portions of the recording layer. Therefore, in order to erase a recording mark, a transition from the amorphous phase to the crystalline phase should take place in the region of the recording mark. The transition from the amorphous phase to the crystalline phase is carried out in the following manner. The recording layer of a rotating rewritable optical disk is subjected to irradiation with a laser of a relatively low power for a relatively extended period of time. By doing so, a broader region of the recording layer is heated to a temperature that is higher than the glass transition point but does not exceed the melting point. At such time, the heated region of the recording layer, after being heated, is cooled slowly. As a result, this broader region of the recording layer undergoes a transition to the crystalline phase. In this manner, existing recording marks can be erased from a rewritable optical disk. Furthermore, when erasing recorded user data from the data recordable area or overwriting recorded user data by recording other user data (in other words, erasing recorded user data and writing other user data on top of it), test recording patterns related to the recorded user data in the outer power calibration area and/or recording management information kept in the recording management area also are erased or overwritten.

When recording actual data to a rewritable optical disk based on the phase-change recording system, irradiation is carried out by switching the laser between the above-mentioned high power and low power. By doing so, the erasure and formation of recording marks is carried out simultaneously, which enables data rewriting on the optical disk.

Below, the modes used for carrying out the present invention are described in detail by referring to drawings, based on its preferred embodiments.

(Information Recording Medium)

FIG. 1 shows a conceptual diagram of a recording area on an optical disk (DVD-R) according to an embodiment of the information recording medium of the present invention. Furthermore, FIG. 1 shows a recording area on the outer periphery of the DVD-R used in the present embodiment.

As shown in FIG. 1, on the inside of a lead-out area 60, the DVD-R used in the present embodiment has an outer PCA 70 (second PCA) used for maintaining records of recording history information. Furthermore, this is not shown in FIG. 1, but the DVD-R includes a lead-in area on the inside of a user area 50, as well as with a recording management area (RMA) and an inner PCA (first PCA) further on the inside.

Moreover, as explained in the present embodiment, the information area on the DVD-R is divided into a user area 50 and a lead-out area 60, with read end data 54 and the outer PCA 70 forming part of the user area 50. However, in future standards, the areas containing the read end data 54 and the outer PCA 70 may be defined as areas different from the "user area."

In FIG. 1, the inner periphery is not shown, however, in the user area, user data 51 is recorded successively from the inner periphery to the outer periphery, and the last user data recorded on the DVD-R is the user data (final user data) represented by the reference symbol 52. A border-out 53 is recorded on the outside of the final user data 52. Furthermore, explanations regarding the border-out are provided below. In the example of FIG. 1, the address of the back end of the border-out 53 is the final address of the user data 51. Read end data 54 is recorded on the outside of the final user data 52 and its border-out 53, with the outer PCA 70 (second PCA) provided further on the outside. The read end data 54 is data intended for setting clear boundaries between the user data 51 and the outer PCA 70 and can use any arbitrary data so long as it allows for discriminating the two.

In a conventional DVD-R, the data recordable area (user area) used to have a radius of up to 58 mm and the lead-out area that of 58.0~58.5 mm, but in the DVD-R of the present embodiment, the last address of the data recordable area is modified to be further inside than the 58-mm radius location by rewriting the final address of the data recordable area allowing for recording of RMD information, i.e. a copy of conventional land pre-pit information. By doing so, even if user data recording stops at the final address location of the RMD information and read end data 54 is recorded thereafter, there will be no overwriting of the outer PCA 70.

In the present embodiment, the radius of the user data is up to 57.7 mm, the radius of the read end data is up to 57.9 mm, and the radius of the outer PCA is 57.9~58.0 mm. In other words, the width of the lead-out area is 0.2 mm and the width of the outer PCA is 0.1 mm. The volume of data in the lead-out area is about 100 MB and is about 20 MB in the PCA. The region of the read end data 54 should be detectable during reproduction in a DVD player, and if compatibility can be guaranteed, its width may be made as narrow as 0.1 mm. At such time, a configuration may be used in which the user data extends to 57.7 mm, the read end data to 57.8 mm, and the outer PCA is 57.8~57.9 mm, with the outer PCA located further inside.

Figure 2:
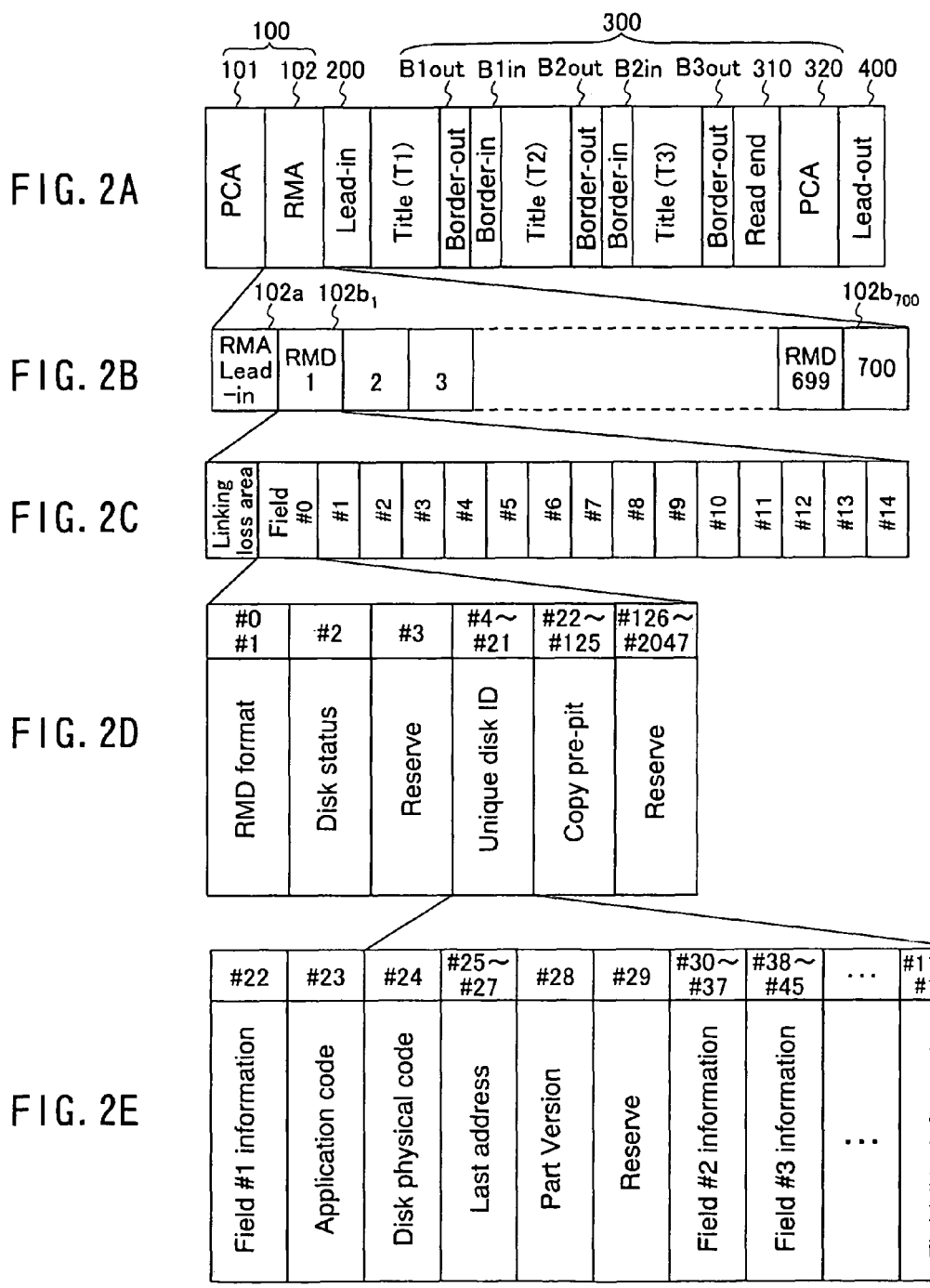
FIG. 2 is a conceptual diagram of the logical format of a DVD-R.

FIG. 2 is a diagram illustrating the physical format of the recording area of the DVD-R used as the information recording medium in the present embodiment. In particular, FIG. 2A illustrates the physical format of the entire recording area of the DVD-R. In the span from the innermost periphery to the outer periphery, the recording area of the DVD-R is divided into an R-information area 100, a lead-in area 200, a data recordable area 300, and a lead-out area 400. The respective areas are made up of an integral number of ECC blocks, and are identified by pre-pits. The R-information area 100 contains a write power calibration area (PCA: Power Calibration Area) 101 and a recording management information area (RMA: Recording Management Area) 102.

The PCA 101 is an area used for test writing of predetermined recording patterns during write strategy correction, as described later, and during calibration of the write power of the laser (optimum write power calibration (OPC: Optimum Power Calibration)).

The RMA 102 is an area used for maintaining records of recording management information (RMD: Recording Management Data) and information on the file system of the DVD-R used in the present embodiment.

The lead-in area 200 is an area used for recording predetermined data indicating the beginning of the data recordable area 300. The data of the lead-in area 200 is recorded at the end of recording of continuous data recorded during initial recording, in other words, in the case of FIG. 2A, at the end of recording of the data of title T3.

The data recordable area 300 is an area used for writing the target recording data. The data recordable area 300 is divided into a number of border zones $B_i$ (i=1, 2, 3, . . . ), one for each recording session. The border zones $B_i$ are made up of border-out areas $B_{iout}$, which are closer to the inner periphery, and border-in areas $B_{iin}$, which are closer to the outer periphery of the disk. Continuous data recorded during a single recording session, in other words, data belonging to a single title, is recorded between two border zones $B_i$ and $B_{(i+1)}$. The border-out area $B_{iout}$ and border-in area $B_{iin}$ are secured by linking processing at the start of recording of the corresponding title. Moreover, the writing of data to the respective areas is performed at the end of recording of the corresponding title. Furthermore, an outer PCA 320 (second PCA) and a read end area 310, where records of the above read end data are maintained, are provided in the terminal portion of the lead-out area 400 in the data recordable area 300.

The lead-out area 400 is an area used for recording predetermined data indicating the end of the data recordable area 300. Data contained in the lead-out area 400 are recorded upon completion of writing to the data recordable area 300, in other words, during finalization processing.

FIG. 2B illustrates the physical format of the RMA 102 in detail. For example, the RMA 102 may be made up of 701 ECC blocks. The initial ECC block is an RMA lead-in area 102a. The RMA lead-in area 102a is a buffer area between the PCA 101 and the areas $102b_1$~$102b_{700}$, where RMD is recorded. This prevents RMD from being inadvertently overwritten and destroyed during test writing in the PCA 101. The respective areas $102b_1$~$102b_{700}$ are areas used for recording RMD on a title-by-title basis.

FIG. 2C is a diagram that illustrates the physical format of a single piece of RMD in detail. The RMD is made up of a single ECC block, and thus contains 16 sectors. The initial sector is a linking loss area. Only predetermined data that indicate blank space, for example, 00h, is written to the linking loss area. In other words, the linking loss area is a buffer area between different pieces of RMD. When the recording of a title is over, this prevents the existing RMD from being overwritten by new RMD during incremental recording of other titles.

The respective remaining 15 sectors of the RMD are called "fields." Starting from the beginning, the respective fields are numbered #0 through #14. General information on the DVD-R used in the present embodiment is recorded in the initial field #0. For example, it contains a copy of disk status and pre-pit information, etc. OPC-related information is recorded in the second field, #1.

FIG. 2D is a diagram illustrating the logical format of field #0 in detail. Field #0 is made up of a single sector. Therefore, the amount of data that can be recorded in field #0 is essentially 2,048 Bytes=2 KB. Serial numbers #0~#2047, called "byte positions" (BP), are assigned to the respective data on a byte-by-byte basis.

RMD formatting codes are recorded, respectively, at BP #0~#1, the disk status (disc status) at BP#2, and a reserve at BP#3. The disk status shows the writing mode used on the disk, identifying whether it is unrecorded, disk-at-once (Disk at once), incremental recording (incremental recording), or finalized (finalized).

A unique disk ID (Unique Disk ID) is recorded at BP#4~#21. The time and date of test recording on the drive is recorded here.

A copy of the pre-pit information is recorded at BP#22~#127, and a reserve at BP#128~#2047, respectively. FIG. 2E is a diagram illustrating the copy of the pre-pit information in detail.

The pre-pit information also is located in fields #0~#13, with information in field #0 representing RMD #22~#29, information in field #2 representing RMD #30~#37, and information in field #3 representing RMD #38~#45, such that information in each field represents 8 Bytes of RMD. Furthermore, information on the write strategy and write power corresponding to each recording speed is entered in each field. For example, information related to the 1× speed is entered in fields #2~#5, information related to the 2× speed is entered in fields #6 and #7, and information related to the 4× speed is entered in fields #8~#13. Moreover, this is just an example, and information related to even higher recording speeds may be recorded as well.

The field ID of BP#22 corresponds to pre-pit field #1, with an application code recorded at BP#23 and a disk physical code at BP#24, respectively. The disk physical code contains a record of the track pitch, linear velocity, disk diameter, etc.

The last address information of the recordable data area (Last Address of data recordable area) is recorded at BP#25~#27, the part version (Part Version) at BP#28, and a reserve at BP#29, respectively. The last address information of the BP data area defines the recordable region on the outer periphery of the disk. BP#28 is used for determining which version of the standard the disk complies with.

The extent of the recordable data area on the DVD-R can be modified by rewriting the last address information recorded at BP#25~#27 using drives. In other words, by overwriting the last address information recorded at BP#25~#27 with an address indicating the location of the innermost periphery of the outer PCA, the extent of the user data recordable area can be shrunk inward, and the outer PCA can be protected at the boundary between the user area and the lead-out area. In addition, this prevents the outer PCA from being destroyed when a user writes to the DVD-R of the present embodiment using one drive and then attempts to write to the same DVD-R using another drive.

For example, if a test recording pattern is recorded in the outer PCA of the DVD-R according to the present invention using a new drive based on the present invention and the same DVD-R subsequently is mounted in a conventional low-speed recording drive (a low-speed recording drive commercially available in the past), the low-speed recording drive will not be able to recognize the presence of the PCA on the outer periphery and there is a risk that it may end up overwriting user data in the outer PCA. However, if the last address information (BP#25~#27) in the RMD information is rewritten to indicate locations further inward from the outer PCA whenever a new drive based on the present invention is used for recording, then a conventional low-speed recording drive subsequently using the same DVD-R will not write data to addresses exceeding the location indicated by the last address information, which will make it possible to prevent the outer PCA from being destroyed.

It is believed that the outer PCA frequently is used when disks compatible with high-speed recording, such as 8× disks, 16× disks, etc. are recorded at high speeds. For this reason, more stable recording conditions can be obtained by modifying the last address information so as to configure the outer PCA at a more inward location when the drive rewrites the last address information. Quite naturally, it is also possible to configure the disk at the stage of manufacture in such a manner that the last address information is placed at a more inward location in order to move the outer PCA to a more inward location.

FIG. 3 illustrates situations in which after recording a disk in a certain drive, recording on the same disk is performed using other drives; the diagram shows which drives should rewrite the last address information in each case. Furthermore, although DVD-R writing modes include the disk-at-once (Disk at once) mode and the incremental recording (incremental recording) mode, here, explanations are provided regarding incremental recording, during which recording on a single disk is performed using a plurality of drives.

In FIG. 3, Case 1 illustrates a situation in which a first recording drive used to make an initial recording utilizes of the outer PCA, and a second recording drive used for subsequent recording also uses the outer PCA. In such a case, the first recording drive rewrites the last address information of the RMD to indicate a more inward location than the location of the innermost periphery of the outer PCA, thereby modifying the last address of the data area in which user data can be recorded. Because the second recording drive also makes use of the outer PCA (in other words, it is a drive capable of correctly recognizing the outer PCA), the outer PCA will not be overwritten.

Case 2 illustrates a situation in which a first recording drive makes use of the outer PCA and a second recording drive used for subsequent recording utilizes only the inner PCA (in other words, the second recording drive is a conventional drive). In such a case, the first recording drive rewrites the last address information of the RMD to indicate a more inward location than the location of the innermost periphery of the outer PCA, thereby modifying the last address of the data area in which user data can be recorded. The second recording drive makes use only of the inner PCA and does not use the outer PCA. In addition, since the last address information of the RMD is rewritten to indicate a more inward location than the location of the innermost periphery of the outer PCA and the second recording drive does not write user data past the last address information, the outer PCA will not be overwritten with user data.

Case 3 illustrates a situation in which a first recording drive makes use only of the inner PCA (in other words, the first recording drive is a conventional drive), and a second recording drive used for subsequent recording makes use of the outer PCA. In such a case, the second recording drive, along with using the outer PCA, rewrites the last address information of the RMD to indicate a more inward location than the location of the innermost periphery of the outer PCA, thereby modifying the last address of the data area for which user data can be recorded.

Case 4 represents a situation, in which a first recording drive makes use only of the inner PCA and a second recording drive used for subsequent recording also makes use only of the inner PCA. In such a case, the outer PCA is not used, and the operation is the same as in case of conventional low-speed recording.

As can be seen from Cases 1~4 above, even though recording on a DVD-R of the present embodiment is performed using both a drive that utilizes the outer PCA (the drive of the present embodiment) and a conventional drive that does not utilize (does not recognize) the outer PCA, in all cases the outer PCA is protected.

Figure 4A:
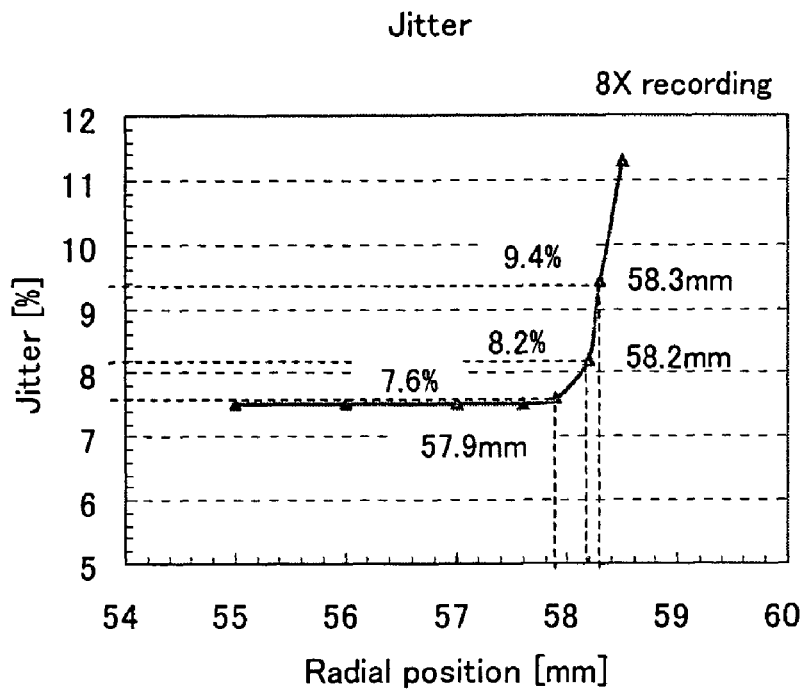
FIG. 4A is a graph illustrating the relationship between radial position and jitter during 8× recording.

FIG. 4A illustrates a relationship between radial position (outermost portion) on a sample DVD-R disk used for recording at 8× and jitter. The X-axis represents radial position on the disk, and the Y-axis represents jitter. As far as recording conditions are concerned, recording is performed using optimum write power in all positions and the same write strategy. As can be seen, when the radius exceeds 58.0 mm, jitter abruptly deteriorates.

Figure 4B:
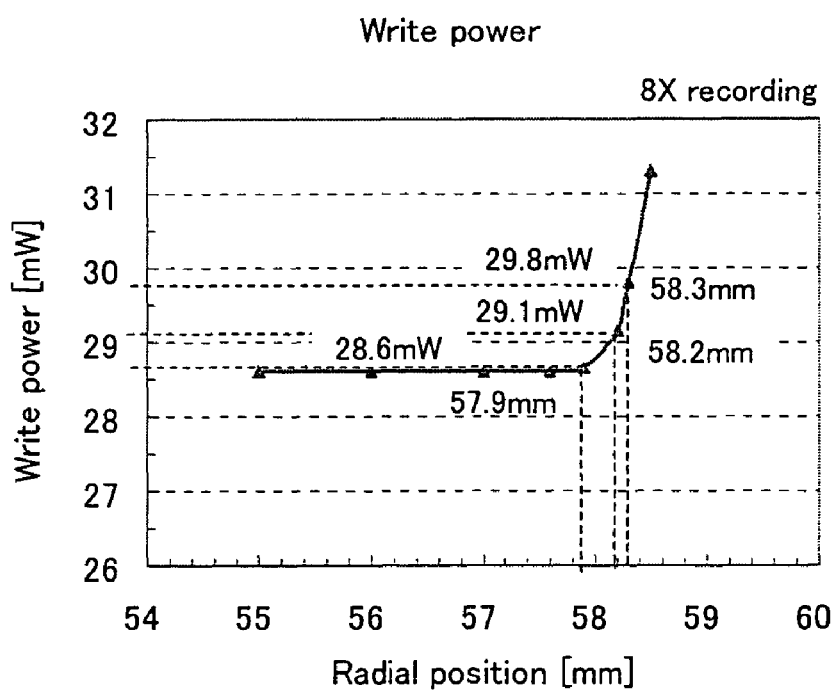
FIG. 4B is a graph illustrating the relationship between radial position and write power during 8× recording.

FIG. 4B illustrates the relationship between radial position (outermost portion) on a DVD-R disk used for recording at 8× and write power. The X-axis represents radial position on the disk, and the Y-axis represents optimum write power. As far as recording conditions are concerned, recording is performed using optimum write power in all positions and the same write strategy. As can be seen, when the radius exceeds 58.0 mm, recording sensitivity deteriorates abruptly.

As can be seen from the above, more stable characteristics will be obtained by performing power calibration with the outer PCA located further inside than the 58.0-mm radial position.

(Information Recording and Playback Device)

Next, explanations are provided regarding the configuration and operation of a DVD-R recorder as an example of the information recording and reproducing devices used with the information recording medium (here, DVD-R) of the above embodiment.

[Configuration of Information Recording and Playback Device]

Figure 5:
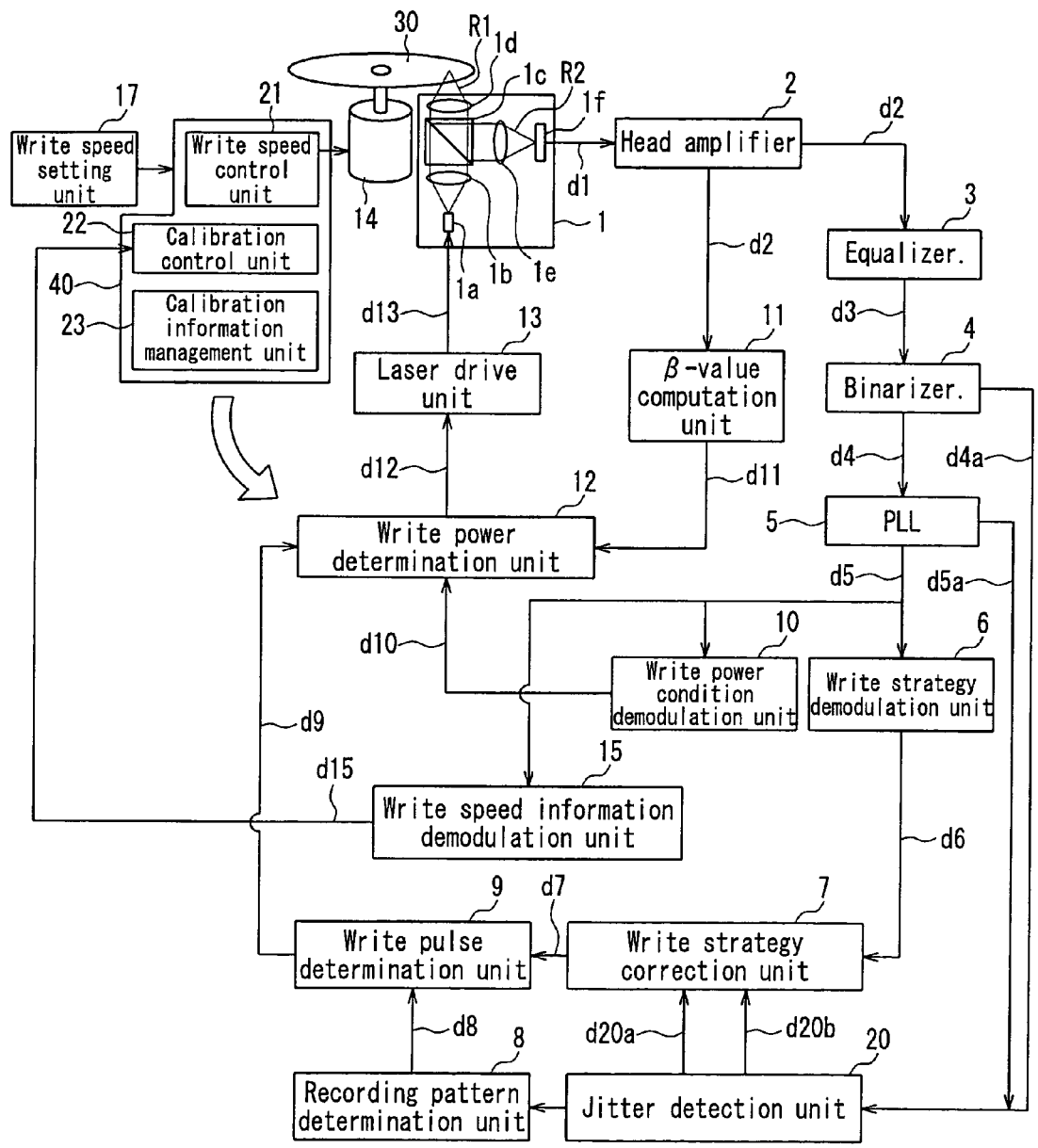
FIG. 5 is a block diagram illustrating the configuration of an information recording and reproducing device according to an embodiment of the present invention.

An example of the configuration of the information recording and reproducing device (DVD-R recorder) of the present embodiment is illustrated in FIG. 5. As shown in FIG. 5, the information recording and reproducing device of the present embodiment is provided with a pickup 1, a head amplifier 2, an equalizer 3, a binarizer 4, a PLL 5, a write strategy demodulation unit 6, a write strategy correction unit 7, a recording pattern determination unit 8, a write pulse determination unit 9, a write power condition demodulation unit 10, a β-value computation unit 11, a write power determination unit 12, a laser drive unit 13, a spindle motor 14, a recording speed information demodulation unit 15, a recording speed setting unit 17, and a control unit 40. The control unit 40, whose connections with other units are not shown, controls the entire operation of the information recording and reproducing device by sending the necessary control commands etc. to the units of the information recording and reproducing device. There are various kinds of control operations performed by the control unit 40, but FIG. 5 only shows a calibration control unit 22 and a calibration information management unit 23 as subblocks of the control unit 40. The calibration control unit 22, as described below, determines whether to perform power calibration in the outer PCA or inner PCA and performs power calibration by controlling the pickup 1 and other necessary blocks. The calibration information management unit 23, as described below, controls the pickup 1 and other necessary blocks for the purpose of copying data between the inner PCA and outer PCA, as well as deleting etc. test recording data in the PCAs.

[Playback System]

First of all, explanations are provided regarding the reproduction system of the information recording and reproducing device illustrated in FIG. 5.

In FIG. 5, 30 is an optical disk (here, a DVD-R). The optical disk 30 is rotated about its central axis by a spindle motor 14.

The optical head, in other words, the pickup 1, irradiates the optical disk 30 with a laser and converts the reflected light into an analog signal in the following manner. A semiconductor laser 1a outputs a laser beam of a predetermined power. The power used at such time (reproduction power) is kept sufficiently small so as to avoid altering the recording layer of the optical disk 30. The laser beam R1 outputted from the semiconductor laser 1a is focused on the recording layer of the optical disk 30 by passing through a condenser lens 1b, a splitter 1c, and an objective lens 1d. The laser R1 is reflected by the recording layer of the optical disk 30. The reflected laser beam R2 is focused on a photodetector 1f by passing through the objective lens 1d, the splitter 1c, and a detector lens 1e. The photodetector 1f detects the reflected laser R2 and converts it to an analog signal d1. At such time, the amplitude of the analog signal d1 is substantially proportional to the intensity of the reflected laser R2.

The pickup 1 is moved in the radial direction of the optical disk 30 by a stepping motor (not shown). By doing so, the focal point of the laser beam R1 outputted from the semiconductor laser 1a is moved in the radial direction of the optical disk 30.

An analog signal d2, obtained by amplifying the analog signal d1 of the pickup 1, is outputted by the head amplifier 2 to the equalizer 3. The equalizer 3 rectifies the waveform of the analog signal d2 obtained from the head amplifier 2. By comparing an analog signal d3 obtained by rectification to a predetermined threshold value, the binarizer 4 performs binarization using the threshold value as a limit. By doing so, the analog signal d3 is converted into a digital signal d4. A phase locked loop (PLL) 5 synchronizes the digital signal d4 with a predetermined clock signal. A data demodulation unit (not shown) demodulates data from a digital signal d5 obtained by synchronization with the clock signal.

[Recording System]

Next, explanations are provided regarding an example of the recording system used in the information recording and reproducing device of the present embodiment.

A recording pattern determination unit 8 determines a recording pattern in response to target data to be recorded on the optical disk 30. Here, the term "recording pattern" refers to a rectangular pulse train of a constant height. The respective pulse width of a recording pattern shows the length of a recording mark (mark length), and the pulse interval shows the length of the recording space (space length).

A write pulse determination unit 9 determines a write pulse d9 based on a recording pattern d8 determined by the recording pattern determination unit 8. Here, the term "write pulse" refers to a pulse with substantially the same rectangular waveform as the laser pulse outputted from the semiconductor laser 1a. As described below, the waveform of the write pulse d9 is different from the waveform of the recording pattern d8. The write pulse d9 is determined in accordance with certain conditions based on the recording pattern d8. These conditions are called a "write strategy" (Write Strategy). In addition, they are also known as "write pulse conditions" or "write pulse structure" (Write Pulse Structure). The write strategy is described in detail hereinbelow.

The write-power determination unit 12 determines the power of the semiconductor laser 1a during data recording. The thus determined power value is called a write power. The determined write power d12 is outputted to the laser drive unit 13.

The laser drive unit 13 controls the driving electric current d13 fed to the semiconductor laser 1a. Therefore, the driving electric current d13 flows through the semiconductor laser 1a at a magnitude corresponding to the write power d12. As a result, the semiconductor laser 1a emits a laser beam R1 whose power matches the write power d12.

[Configuration Used for Write Strategy Correction and Write Power Calibration]

The shape of the recording mark formed by laser irradiation is not uniquely determined by the write pulse and the write power alone. For instance, the rate of cooling of the recording layer depends on the ambient temperature at the time of recording. Moreover, the wavelength of the semiconductor laser fluctuates in a manner that is substantially proportionate to temperature fluctuations in the semiconductor laser. For example, since the light absorption characteristics of the organic dye contained in the recording layer of a DVD-R depend on the wavelength of the absorbed light, fluctuations in the wavelength of the laser cause fluctuations in the energy absorbed by the recording layer. In addition, the wavelength of the semiconductor laser, the structure of the optical disk, etc. usually fluctuate around a normal value depending on the product used. As a result of the above mentioned fluctuation factors, the shape of the recording mark may vary. Therefore, determination of the write pulse and write power in accordance with standard-compliant write strategies and write power conditions does not sufficiently raise the accuracy of correction of the shape of recording marks, in particular, the accuracy of edge positioning. As a result, the error rate of actually recorded data cannot be reduced sufficiently. Thus, the write strategy is corrected and the write power is calibrated for each individual optical disk and optical disk recording and reproducing device. The respective optimum write pulse and write power are determined as a result.

In addition, in order to perform write strategy correction and write power calibration, the optical disk recording and reproducing device of the present embodiment has, for instance, the following configuration.

The $\beta$ value computation unit 11 computes a $\beta$ value of the signal d2 obtained from the head amplifier 2. Here, the $\beta$ value of the analog signal is defined by the maximum value a and minimum value b of the analog signal using the following formula:

$$\beta=(a+b)/(a-b).$$

Namely, the $\beta$ value corresponds to a value obtained by normalizing the central value $((a+b)/2)$ of the analog signal waveform in the vertical direction by the amplitude $(a-b)$.

Moreover, as described below, the $\beta$ value of the analog signal is a parameter that determines the write power of the semiconductor laser 1a. The analog signal d1 reproduced by the pickup 1 is binarized by the binarizer 4 using a predetermined threshold value as a limit. If the central value of the waveform of the analog signal d1 in the vertical direction deviates from the threshold value at such time, the accuracy of the reproduction of the original digital data decreases. In other words, the error rate of the digital data changes depending on the $\beta$ value. Therefore, the optimum value of the $\beta$ value of the analog signal d1 must be selected in such a manner that the error rate is reduced to below a predetermined allowable value. Since the $\beta$ value of the analog signal d1 is determined substantially by the shape and optical reflectance of recording marks on the optical disk 30, it consequently is determined by the write power of the laser beam R1 emitted from the semiconductor laser 1a. Conversely, if the $\beta$ value of the analog signal d1 is determined, it is then possible to determine a write power corresponding thereto. The correspondence between the $\beta$ values of the analog signal and the write power is called "write power conditions."

Standard write strategies and standard write power conditions established by the standard, along with the history of write strategies and write power conditions used for data recording in the past, are recorded in a predetermined area of the optical disk 30. The write strategy demodulation unit 6 demodulates a write strategy 6 from the digital signal d5 outputted from the PLL 5 and outputs it to a write strategy correction unit 7. On the other hand, the write power condition demodulation unit 10 demodulates write power conditions d10 from the digital signal d5 and outputs them to a write power determination unit 12.

The jitter detection unit 20 receives, respectively, a digital signal d4a from the binarizer 4 and the variation of the digital signal d4 from the clock signal, in other words, jitter d5a, from the PLL 5. In response to these inputs, the jitter detection unit 20 detects jitter d20a at the leading edge and jitter d20b at the trailing edge of the pulse of the digital signal d4 and outputs them to the write strategy correction unit 7.

The write strategy correction unit 7 stores the inputted write strategy d6 in its internal memory (not shown). Moreover, when the stored write strategy is corrected, the jitter d20b at the trailing edge and jitter d20a at the leading edge of the pulse of the digital signal d4 are compared with respective predetermined allowable values. The write strategy correction unit 7 stores the results of the comparison in memory in conjunction with a write strategy stored at such time. Subsequently, the write strategy correction unit 7 corrects the write strategy by a predetermined correction value. Upon correction, the write strategy d7 is stored and outputted to the write pulse determination unit 9 as well.

[DVD-R Title Recording Operation]

In the information recording and reproducing device of the present embodiment (DVD-R recorder), recording of titles is carried out in the following manner.

Figure 6:
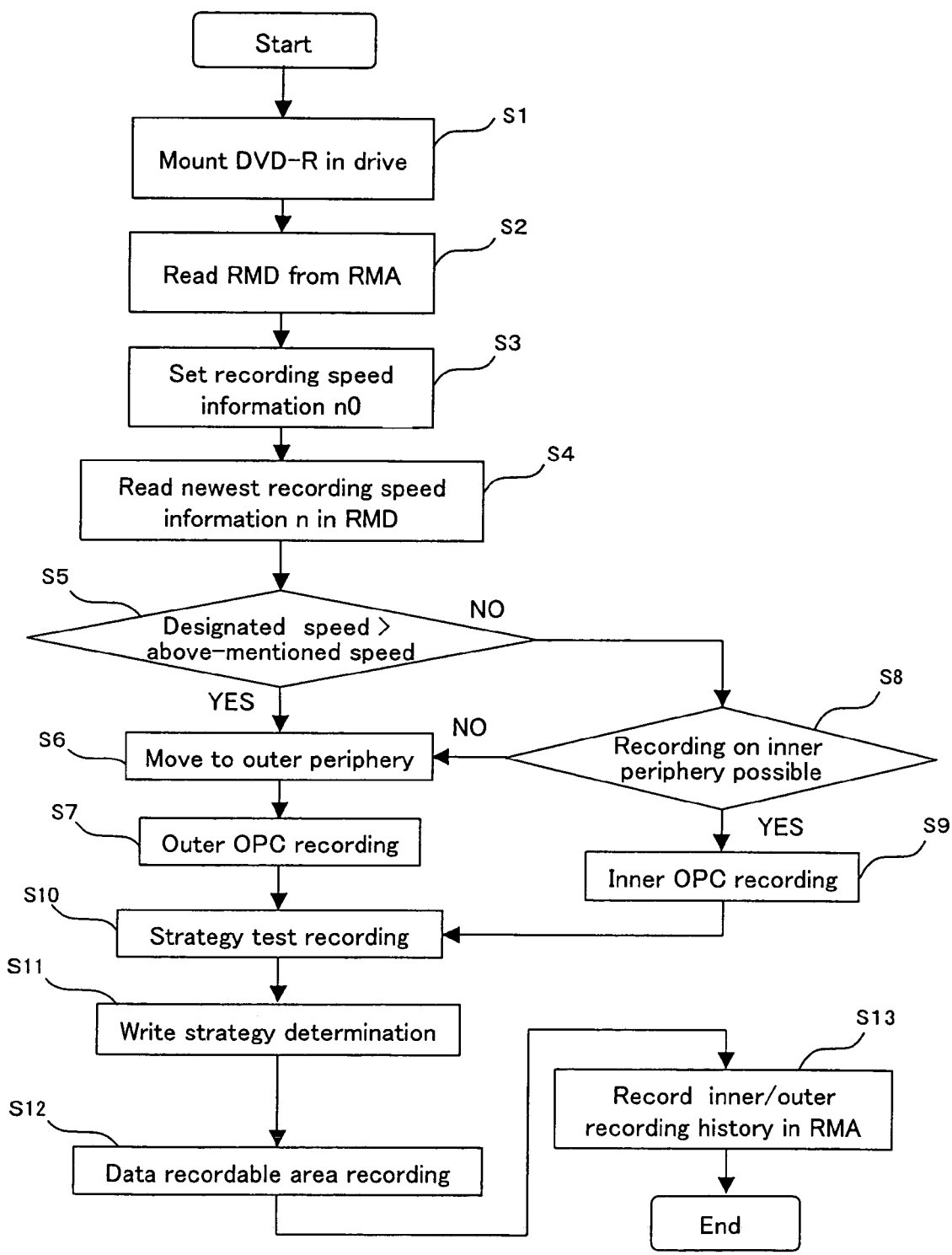
FIG. 6 is a flow chart representing the operation of an information recording and reproducing device according to an embodiment of the present invention

FIG. 6 is a flow chart illustrating an operation, wherein the information recording and reproducing device of the present embodiment (DVD-R recorder) uses a DVD-R as an optical disk 30 to record titles thereon.

<Step S1> First of all, the DVD-R is mounted in the DVD-R recorder.

<Step S2> After detecting insertion of the DVD-R, the DVD-R is set into rotation by the spindle motor 14. First of all, the pickup 1 refers to the RMA of the DVD-R and reads out the RMD.

<Step S3> The user of the DVD-R recorder sets the recording speed using the recording speed setting unit 17. Specifically, a positive integer n0, which shows the ratio of the set recording speed to the standard recording speed of 3.49 m/s is inputted as set recording speed information.

<Step S4> The recording speed information demodulation unit 15 reads out recording speed information from a RMD in the RMA. The data preferably is read out starting from the newest entry. As mentioned above, the recording speed information read out at such time is a positive integer n indicating the ratio of the recording speed to the standard recording speed of 3.49 m/s.

<Step S5> The recording speed information read out from the recording speed information demodulation unit 15 is inputted to the calibration control unit 22 of the control unit 40 and compared, as recording speed information n, to the set recording speed information n0. When the recording speed information n is larger than the set recording speed information n0, processing goes to Step S6. Otherwise, processing goes to Step S8. Furthermore, if there is no RMA information and if the recording speed information n0 is larger than the preset recording speed n, processing goes to S6, and if it is smaller, to S8.

From the same OPC information as the recording speed information read in Step S4, the strategy demodulation unit 6 reads the write strategy and the write power condition demodulation unit 10 reads the write power conditions, respectively. The write strategy demodulation unit 6 outputs the write strategy d6 to the write strategy correction unit 7. The write strategy correction unit 7 stores the write strategy d6 in its internal memory "as is" without correcting it, and then outputs it to the write pulse determination unit 9. On the other hand, the write power condition demodulation unit 10 outputs the write power conditions to the write power determination unit 12.

<Step S6> After being moved to the outer periphery of the DVD-R under the control of the calibration control unit 22 of the control unit 40, the optical pickup 1 reads the already recorded area in the outer PCA and searches for unrecorded areas in the outer PCA to be used for performing power calibration. In case of an erasable disk, when the recording area of the PCA is used up, it is overwritten, but in a DVD-R/RW, there is no information as to the extent to which the recording area has been used, and therefore a search is performed for unrecorded areas by reproducing the outer PCA. Furthermore, at such time, a test recording pattern recorded in the outer PCA also is read out.

<Step S7> The starting position of recording in the outer PCA of a DVD-R is determined based on the last address information, with recording carried out starting from the outermost periphery of the outer PCA. The recorded signal is a mixed pattern made up of 8-14 modulated random signals, 3T signals, and 14T signals. Write power calibration is carried out in the following manner. The recording pattern determination unit 8 outputs a test recording pattern d8. Based on the test recording pattern d8, the write pulse determination unit 9 determines a test write pulse d9. Next, the write power determination unit 12 sets the write power to a predetermined initial value. Here, such an initial value is determined by selecting a write power corresponding to the target β value based on the write power conditions (for instance, the target β value is contained in the write power conditions demodulated by the write power condition demodulation unit 10, etc.). The disk is irradiated with laser light corresponding to the write power d12, producing test recording marks in the PCA.

The pickup 1 irradiates the test recording marks in the PCA with laser light at reproduction power, thereby obtaining reflected light. The reflected light is converted to the analog signal dl and the head amplifier 2 outputs the analog signal d2. Based on the analog signal d2, the β value computation unit 11 computes a β value d11. The write power determination unit 12 stores the computed β value. Subsequently, the above-described process is repeated by changing the write power by a predetermined power width one step at a time, starting from the initial value. For example, if the optimum write power read from the write power conditions is 30 mW, then recording at 28 mW to 32 mW with one sector every 0.5 mW takes 9 steps, with 9 sectors allocated thereto. By doing so, recording is completed within 1 ECC block (=16 sectors). Playback is performed immediately after recording, and, as a result, a β value and a write power providing the best characteristics are selected by the write power determination unit 12. A correspondence table showing changes in the write power (step numbers) and β values, in other words, new write power conditions, is obtained in this manner. The optimum write power corresponding to the target β value is selected from these new write power conditions.

<Step S8> The calibration control unit 22 of the control unit 40 determines whether test recording can be performed in the inner PCA at the determined recording speed. When the recording speed is high, or when the characteristics are not obtained in the inner PCA, processing goes to Step S6, wherein the outer PCA is used to perform the test recording.

<Step S9> OPC is carried out in order compute the optimum power in the inner PCA.

<Step S10> Upon determination of the write power, test recording is carried out using the write strategy recorded in memory and the write strategy demodulated from the RMA. At such time, test recordings corresponding to the recording speed are made in the inner PCA and outer PCA.

<Step S11> A write strategy is determined.

<Step S12> Upon determination of the strategy, the pickup moves to the inner periphery and data recording starts.

<Step S13> When data recording is over, the calibration information management unit 23 records the optimum recording information recorded in the PCA on the inner and outer periphery to the RMA and the memory of the recording and reproducing device.

After going through Steps S1~S13 above, the recording of the title to the DVD-R is complete.

Furthermore, in Step S10, a recommended write strategy and recommended write power conditions are read from the DVD-R 30. For instance, the following can be selected here as the recommended write strategy and recommended power conditions. Drive related information is read out by referring to field #1 of the RMD of the DVD-R 30. Based on this information, it is determined whether any of the write strategies and write conditions recorded in the DVD-R 30 were recorded using the same DVD-R recorder. If indeed some of them were, they are adopted as recommended write strategies and recommended write power conditions. In addition, if there are write strategies or write power conditions recorded using the same type of DVD-R recorders, they also may be used.

In this manner, during new title recording, the DVD-R recorder of the present embodiment can read and re-use write, strategies and write power conditions used during recording at a recording speed equal to the set recording speed according to the history stored on the DVD-R 30. Doing so eliminates the need to compensate for the portion due to recording speed differences in the variation of the write strategies and write power conditions from the optimum values. As a result, the write strategy and write power conditions can be determined quickly. In addition, because information from the outer PCA and inner PCA can be shared and compared, recording conditions corresponding to high speed recording can be determined with high accuracy.

During recording and reproduction from DVD-R or DVD-RW disks, as a result of using the CLV (constant linear velocity) system, under which the linear velocity is constant, the rotational speed at the inner periphery, as compared to the rotational speed at the outer periphery, increases in an inverse proportion to the radius. Because the vibration and sounds produced by the rotating motor intensify and produce mechanical noise when a disk is rotated at a high speed, the Zone CLV system is used, in which recording is performed at a low speed from the inner periphery up to a predetermined radial position on the middle diameter, and, from the middle diameter to the outermost periphery, recording is performed at a high speed. For instance, to record at 4× at the inner periphery and at 8× at the outer periphery under the Zone CLV system, it is preferable to do a 4× test recording in the inner PCA and a 8× test recording in the outer PCA to determine the optimum write power and β values and then start recording in the data recordable area. Recording in the middle may, of course, be performed at 6×. The issue of whether the inner PCA or the outer PCA should be used at the 6× speed is determined by the upper performance limit of the rotational speed of the disk-rotating motor of the recording and reproducing device, servomechanism-related surface wobbling, and eccentricity tracking performance.

Upon termination of data recording, recording history information, such as β values and optimum write power determined in the inner/outer PCA, is preferably recorded in the inner recording management information (RMD: Recording Management Data) area in conjunction with the recording speed and selection information regarding whether the inner or outer PCA was used for recording. In this manner, if the disk is removed from the recording and reproducing device and then again inserted and recording is continued, the write power on the inner and outer periphery can be understood by examining the RMD. Therefore, test recording becomes unnecessary, and the time until the start of recording can be shortened. In addition, although the PCA is limited in write-once disks such as DVD-R, using the above configuration makes it unnecessary to perform a test recording each time the disk is mounted and unmounted and eliminates concerns about using up the PCA.

Additionally, in organic dye-based disks such as DVD-Rs, differences in film thickness are generated at the inner and outer periphery and differences in recording sensitivity arise because the dye film is formed by spin-coating. In this regard, correction of the write power used, e.g., up to the middle diameter can be done by performing low-speed recording in the inner PCA, recording at the same low speed on the outer periphery, and performing straight line approximation of the differences in the disk's sensitivity to write power. Although high-speed recording is impossible on the inner periphery, correction of the write power used, e.g., from the middle to the outermost periphery, can be done in the same manner by applying the straight line approximation formula to high-speed recording.

In addition, if a test recording pattern recorded in the inner PCA is copied to the outer PCA under the control of the calibration information management unit 23, then even when the inner PCA cannot be reproduced due to disk surface damage or contamination, the disk can be write-enabled for the specified recording speed if the test recording pattern is preserved on the outer periphery. Furthermore, if information from the outer PCA also is copied to the inner PCA, then even when the outer PCA cannot be reproduced due to disk surface damage or contamination, the disk can be write-enabled because the test recording pattern remains in the inner PCA. Although the copying of the test recording patterns recorded in the inner PCA to the outer PCA may be performed in two cases, such as (1) prior to data recording to the data recordable area, and (2) upon termination of data recording to the data recordable area, in view of the reduction in the time until the start of recording, it is preferable to copy them using the timing of (2). Although there are five possible cases for the timing of copying the test recording patterns recorded in the inner PCA to the outer PCA, such as (1) when a test recording pattern is recorded in the outer PCA, (2) when recording is performed at a new recording speed, (3) when recording is performed using a new information recording and reproducing device, (4) every time a predetermined recording operation is carried out, and (5) whenever a recording operation is performed, case (5) is more preferable in terms of fixing accidental problems such as the above-mentioned damage and contamination. In addition, the same applies when copying test recording patterns recorded in the outer PCA to the inner PCA.

In addition, on the outer periphery, there is preferably provided not only a PCA, but also an RMA, and recording management information of RMA is copied from the inner RMA to the outer RMA, and, even more preferably, from the outer RMA to the inner RMA. In the same manner as with the above-described PCA, the copying of the recording management information kept in the inner RMA to the outer RMA may be performed in two cases, such as (1) prior to data recording to the data recordable area, and (2) upon termination of data recording to the data recordable area, but in view of the reduction in the time until the start of recording, it is preferable to copy the information using the timing of (2). Although there are five possible cases for the timing of copying the recording management information recorded in the inner RMA to the outer RMA, such as (1) when making records of recording management information in the outer RMA, (2) when recording is performed at a new recording speed, (3) when recording is performed using a new information recording and reproducing device, (4) every time a predetermined recording operation is carried out, and (5) whenever a recording operation is performed, case (5) is more preferable in terms of fixing accidental problems such as the above-mentioned damage and contamination. In addition, the same applies when copying recording management information kept in the outer RMA to the inner RMA.

The issue of whether power calibration in the inner PCA or power calibration in the outer PCA should be carried out first after a disk mounted in the recording and reproducing device is decided differently depending on the design of the drive. The advantage of doing it first in the inner PCA is that since the inner PCA is arranged next to the lead-in area, which is read by the optical pickup prior to recording and reproduction from the disk, performing power calibration in the outer PCA after first carrying out power calibration in the inner PCA and issuing a command to proceed with high-speed recording enables a smooth transition from low-speed recording to high-speed recording. In addition, since it is difficult to perform recording and reproduction at high speeds on the inner periphery, using the inner PCA and outer PCA appropriately so as to reproduce test recording patterns at low speeds on the inner periphery and reproduce them at high speeds on the outer periphery makes it possible to achieve a reduction in read time.

Furthermore, while the present embodiment uses a single-layer disk as an example, the present invention is applicable to disks with a plurality of recording layers, in which recording is performed from the inner periphery to the outer periphery in all of the plurality of recording layers. In other words, each of the plurality of recording layers may be arranged in an area structure such as the one illustrated in FIG. 1, with the inner PCA and outer PCA of the recording layers used appropriately depending on the recording speed, etc. used for recording on the recording layers.

(Second Embodiment)

Explanations regarding an optical disk (DVD-R) according to another embodiment of the present invention are provided below.

Figure 7:
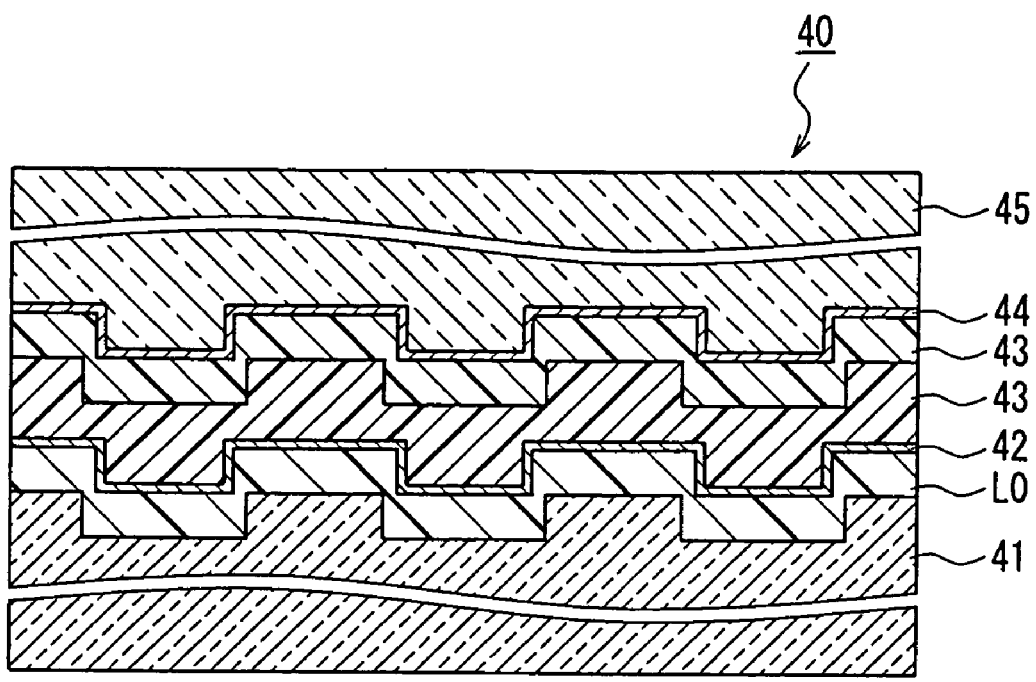
FIG. 7 is a cross-sectional view illustrating the configuration of an information recording medium according to a second embodiment of the present invention.

As shown in FIG. 7, the optical disk 40 used in the present embodiment is a dual layer disk having recording layers L0 and L1 as its recording layers. Namely, the optical disk 40 has a layered configuration made up of a recording layer L0, a semi-transparent layer 42, an intermediate layer 43, a recording layer L1, a reflective layer 44, and a protective layer 45 stacked in the above-described order on the surface of a transparent substrate 41. During recording and reproduction, laser light enters through the transparent substrate 41.

In the optical disk 40, the directions of the track spirals of the recording layer L0 and recording layer L1 are opposed to each other. In other words, when data is written onto the recording layer L0, recording proceeds from the inner periphery to the outer periphery, whereas when data is recorded onto the recording layer L1, recording proceeds from the outer periphery to the inner periphery.

Figure 8A:
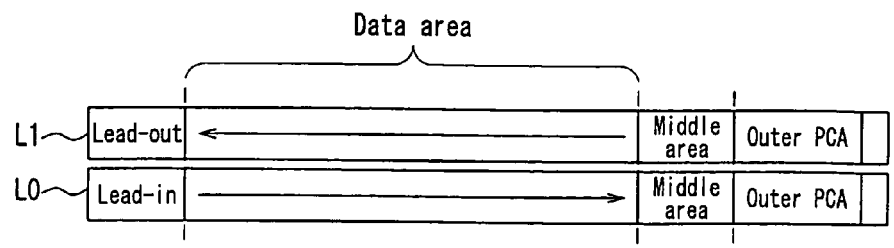
FIG. 8A is a schematic diagram illustrating an example of a writing mode used for an information recording medium according to a second embodiment of the present invention.

Write methods used to write user data on such a dual layer disk include the following 4 methods. In the first method, as shown in FIG. 8A, recording starts from the innermost periphery of the data recordable area of the recording layer L0 and proceeds towards its outer periphery and, when recording completes at the outermost periphery of the data recordable area of the recording layer L0, recording of user data continues from the outermost periphery of the data recordable area of the recording layer L1 towards its inner periphery.

Figure 8B:
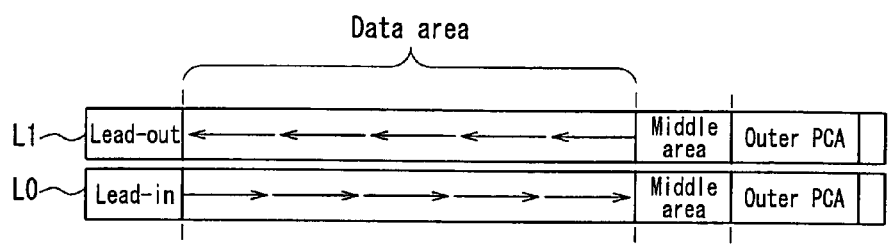
FIG. 8B is a schematic diagram illustrating an example of a writing mode used for an information recording medium according to a second embodiment of the present invention.

As shown in FIG. 8B, in the second method, which involves writing data onto the optical disk a plurality of times, recording starts from the innermost periphery of the data recordable area of the recording layer L0 and proceeds towards its outer periphery. Then, when a single recording is completed and the next recording starts, recording on the layer L0 resumes from the outside of the area, where user data recording was completed the last time, and, when recording completes at the outermost periphery of the data recordable area of the recording layer L0, user data recording starts from the outermost periphery of the data recordable area of the recording layer L1. Then, recording on the layer L1 resumes from the inside of the area, where user data recording was completed last time, and user data recording proceeds towards the inner periphery.

In the third method, in the same manner as in the first method, recording starts from the innermost periphery of the data recordable area of the recording layer L0, but later moves to the recording layer L1 without reaching the outermost periphery of the data recordable area of the recording layer L0, resulting in alternating recording. In this method, which is effective in cases, wherein the volume of the user data to be written is known, the switch from the recording layer L0 to the recording layer L1 is typically performed such that equal amounts of the user data to be written are recorded on the recording layers L0 and L1. By doing so, the time required for finalization processing, during which the unrecorded area of the data recordable area is overwritten with dummy data, can be shortened, which offers the advantage of being able to complete user data recording within a shorter period of time.

In the same manner as the second method, the fourth method is a method in which recording starts from the innermost periphery of the data recordable area of the recording layer L0 and then continues from a point beyond the area, whose recording has been completed, but it is different from the second method in that alternating recording is performed by moving to the recording layer L1 without reaching the outermost periphery of the data recordable area of the recording layer L0. This method is effective, for instance, in cases wherein an area with a radius of 4 cm or less is used as an actual information area on a DVD-R with a diameter of 12 cm. In such a case, the user can use writing software with a plotting function to draw bitmap images as the user desires in the area that is not used as an information area on the information recording surface (for instance, the area located beyond the radius of 4 cm). In addition, DVD-Rs with a diameter of 12 cm can be used as 8 cm multi-layered DVD-ROMs for applications such as pre-masters for software development. In addition, as shown in FIG. 8E, a method is contemplated in which recording starts from the innermost periphery of the recording layer L0 and moves to the recording layer L1 at a predetermined position, resulting in alternating recording without finalization, with sessions of alternating recording continuously interlinked. Doing so not only provides for a reduction in finalization time, but also makes the unrecorded area smaller and thus enables efficient use of the user recording area without wasting it. Even if the optical disk is removed from the apparatus prior to finalizing it, data remain in a recorded state on the recording layer L1, and the compatibility of the disk with ROM disks becomes relatively high.

Furthermore, the first and third methods, wherein data is written to the disk in a single session, are called disk-at-once (Disc at once) recording. On the other hand, the second and fourth methods, wherein data is successively incrementally recorded on the optical disk, are called incremental recording.

Figure 9:
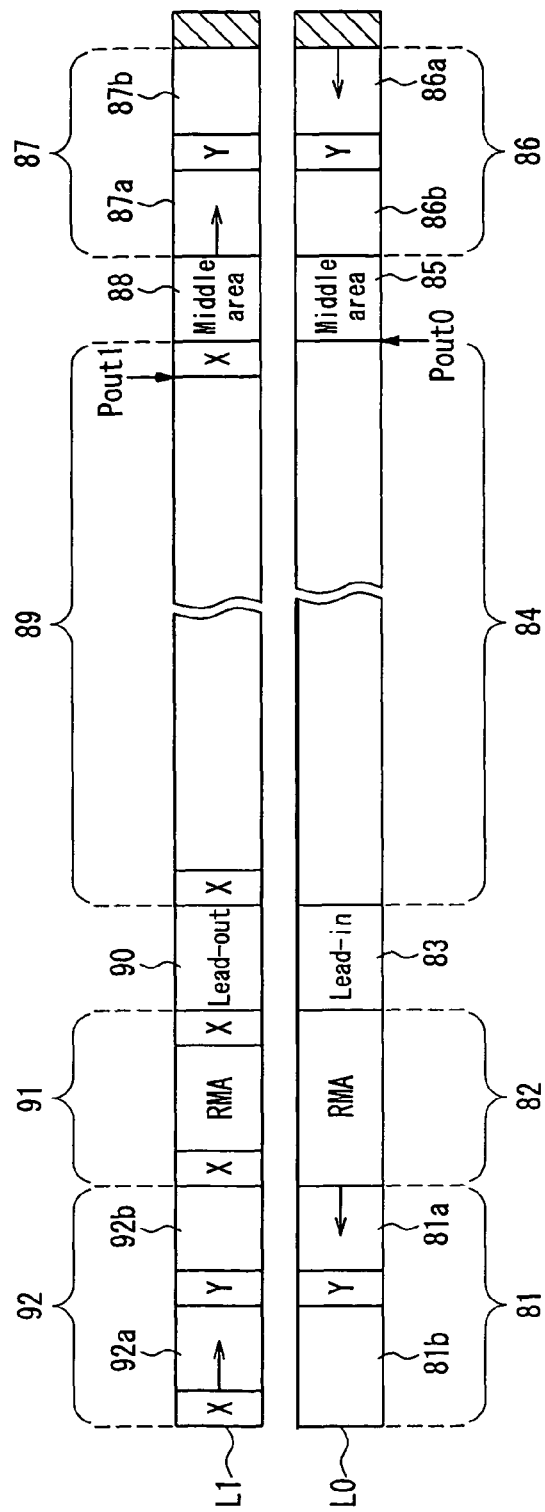
FIG. 9 is a sectional schematic view illustrating an example of an area structure in an information recording medium according to a second embodiment of the present invention.

FIG. 9 is a schematic cross-sectional view illustrating the area structure of the recording layers L0 and L1 of the optical disk 40 in a case, wherein recording is performed in accordance with the above-described first or second method, in other words, in a case, wherein upon completion of recording at the outermost periphery of the data recordable area of the recording layer L0, recording starts from the outermost periphery of the data recordable area of the recording layer L1. Furthermore, FIG. 9 illustrates a radial cross-section of the optical disk 40, with the inner periphery of the optical disk 40 located on the left-hand side and the outer periphery of the optical disk 40 located on the right-hand side in FIG. 9.

In such a case, as shown in FIG. 9, from the inner periphery toward the outer periphery, the recording layer L0 has an inner PCA (inner disk testing area) 81, an RMA 82, a lead-in area 83, a data recordable area 84, a middle area (intermediate area) 85, and an outer PCA (outer disk testing area) 86. In addition, from the inner periphery toward the outer periphery, the recording layer L1 has an inner PCA 92, an RMA 91, a lead-out 90, a data recordable area 89, a middle area 88, and an outer PCA 87. In FIG. 9, Pout 0 indicates the outermost location of the data recordable area 84, in other words, the outermost location of the area where user data can be written on the recording layer L0. In addition, Pout 1 indicates the outermost location of the data recordable area 89, in other words, the outermost location of the area where user data can be written on the recording layer L1. For example, in the case of a disk with a diameter of 12 cm, Pout 0 is located at a distance of 58.08 mm from the center of the disk and Pout 1 is located at a distance of 58.00~58.08 mm from the center of the disk.

When writing data onto the optical disk 40, prior to the start of data recording on the recording layer L0, the optical disk recording and reproducing device carries out laser power calibration by performing a test recording using the inner PCA 81 or outer PCA 86 of the recording layer L0. Here, in the case of low-speed recording at 1× or 2×, test recording in the inner PCA 81 can be conducted, but, for instance, in the case of high-speed recording at 4× or higher, in a drive whose spindle motor rotating the optical disk does not have particularly high performance characteristics, test recording in the inner PCA is sometimes impossible because the rotational speed of the spindle motor reaches its limit. In such a case, it is preferable to use the outer PCA 86. Moreover, the outer PCA 86 may be used even in case of low-speed recording at 1× or 2×. Subsequently, user data is written to the data recordable area 84 of the recording layer L0 using a write power appropriately calibrated for the recording layer L0. Then, when recording on the recording layer L0 is completed, but prior to the start of recording on the recording layer L1, a test recording is conducted using the inner PCA 92 or outer PCA 87 of the recording layer L1 to re-calibrate the write power of the laser. Subsequently, user data is written to the data recordable area 89 of the recording layer L1 using a write power appropriately calibrated for the recording layer L1. In case of low-speed recording at 1× or 2× on the recording layer L1, test recording can be conducted in the inner PCA 92, too, but in case of high-speed recording at 4× or higher, it is preferable to use the outer PCA 87. Moreover, the outer PCA 87 may be used even in the case of low-speed recording at 1× or 2×.

Otherwise, the optical disk recording and reproducing device may be set up to calibrate laser write power for each recording layer by conducting test recordings using the inner PCA and/or outer PCA on both recording layer L0 and recording layer L1 prior to the start of data recording, and then write data onto the respective recording layers L0 and L1 using the calibrated laser write power.

Otherwise, in the case of incremental recording, the device may be set up to first perform power calibration using the inner PCA and/or outer PCA of the recording layer L0, then perform data recording on the recording layer L0 and finally, when it is decided to continue recording by moving from the recording layer L0 to the recording layer L1, perform power calibration using the inner PCA and/or outer PCA of the recording layer L1.

Furthermore, the lead-in 83, middle areas 85 and 88, and lead-out 90 may be recorded by the optical disk recording and reproducing device at the time of finalization, or pre-recorded using predetermined data at the time of manufacture of the optical disk 40.

Figure 10:
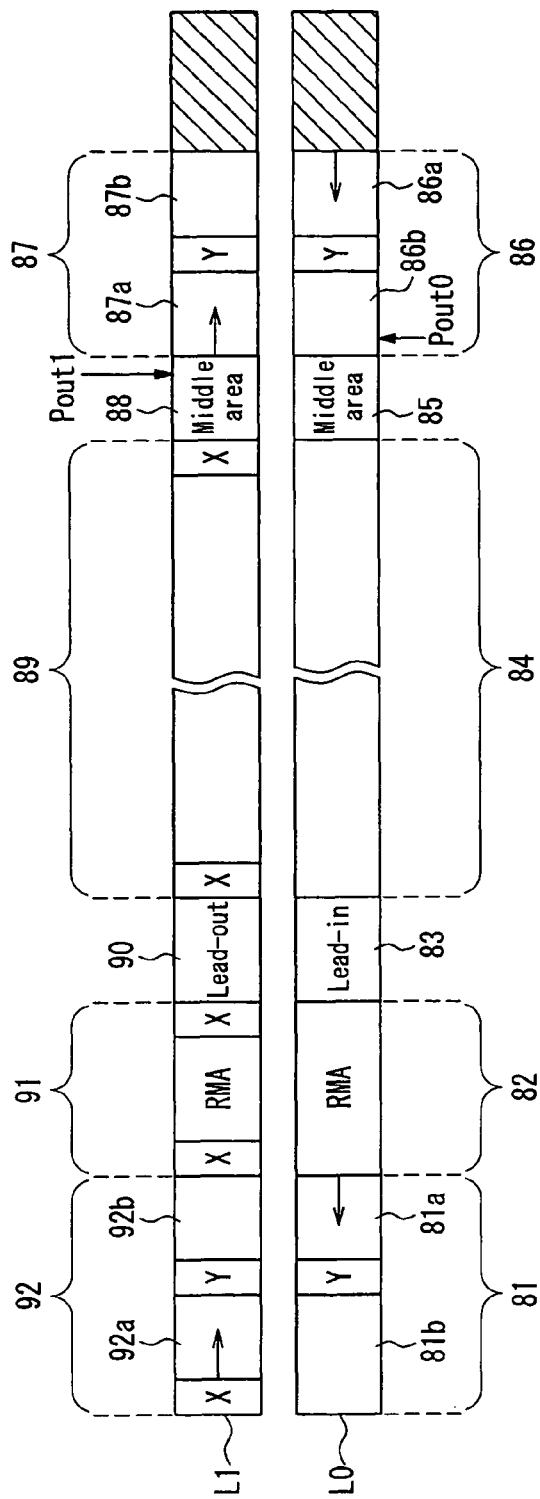
FIG. 10 is a sectional schematic view illustrating another example of an area structure in an information recording medium according to a second embodiment of the present invention.

FIG. 10 is a cross-sectional view illustrating the area structure of the recording layers L0 and L1 of the optical disk 40 in a case in which recording is carried out based on the above-described third or fourth methods, in other words, in a case, wherein recording on the recording layer L1 starts prior to completion of recording at the outermost periphery of the data recordable area of the recording layer L0. Furthermore, FIG. 10 also illustrates a radial cross-section of the optical disk 40, with the inner periphery of the optical disk 40 located on the left-hand side and the outer periphery of the optical disk 40 is located on the right-hand side in FIG. 10.

In this case, as can be seen from a comparison of FIG. 9 and FIG. 10, when recording is carried out based on the third and fourth method, the middle area 85 and outer PCA 86 in the recording layer L0 are shifted towards the inner periphery in their entirety such that at least a portion of the middle area 85 and outer PCA 86 is positioned on the inside of the outermost location Pout 0 of the area where user data can be written as the data recordable area 84. The shifted middle area is called a "shifted middle area", and the shifted outer PCA is called a "flexible outer disk testing area." In other words, the middle area 85 is secured in the vicinity of the outer periphery of the outermost location where user data are recorded in the data recordable area 84 of the recording layer L0, and the outer PCA 86 is secured in the vicinity of the outer periphery of the middle area 85. In addition, in the recording layer L1, the middle area 88 and outer PCA 87 are shifted in their entirety such that at least a portion of the middle area 88 and outer PCA 87 is positioned on the inside of the outermost location Pout 1 of the area where user data can be written as the data recordable area 89. In other words, the middle area 88 is secured in the vicinity of the outer periphery of the outermost location where user data are recorded in the data recordable area 89 of the recording layer L1, and the outer PCA 87 is secured in the vicinity of the outer periphery of the middle area 88. The width of the middle areas 85 and 88 is practically equal to the width of the lead-out, and preferably is guaranteed to be about 0.2 mm or more, or about 0.4 mm, if possible. The middle areas 85 and 88 are recorded using dummy data, in the same manner as the lead-out. If the width is about 0.2 mm, an optical disk recording and reproducing device is capable of recognizing that no significant data is recorded in the area, but to obtain better reliability of recognition by optical disk recording and reproducing devices and/or optical disk reproducing devices, a width of about 0.4 mm is required.

In addition, in some cases, dummy data indicating that middle areas may be pre-recorded in the vicinity of the outer periphery of the outermost locations Pout 0 and Pout 1 of the areas where user data can be written during the manufacture of the optical disk 40. In this case, when the outer PCAs 86 and 87 are shifted towards the inner periphery by conducting recording based on the above-described third or fourth method, as shown in FIG. 11, the middle areas 85 and 88, as well as the outer PCAs 86 and 87, may be arranged in such a manner that they are shifted, in their entirety, further inward than the middle areas 93 and 94 recorded at the time of manufacture.

Figure 11:
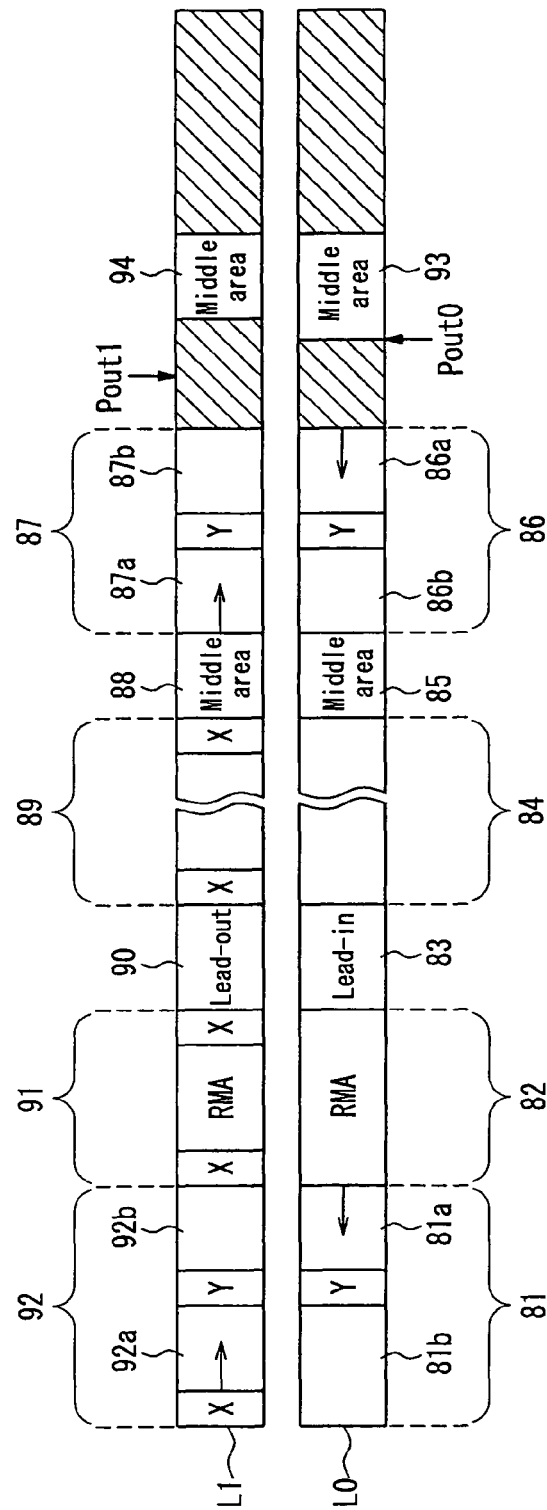
FIG. 11 is a sectional schematic view illustrating yet another example of an area structure in an information recording medium according to a second embodiment of the present invention.

As shown in FIG. 10 and FIG. 11, in case of recording based on the third or fourth method, prior to the start of data recording onto the recording layer L0, the optical disk recording and reproducing device calibrates the write power of the laser by performing test recordings using the outer PCA 86 of the recording layer L0. Here, in case of low-speed recording at 1× or 2×, test recording can be conducted in the inner PCA 81, but in case of high-speed recording at 4× or higher, it is preferable to use the outer PCA 86. Furthermore, the outer PCA 86 may be used even in the case of low-speed recording at 1× or 2×. Subsequently, user data is written to the data recordable area 84 of the recording layer L0 using a write power appropriately calibrated for the recording layer L0. Then, when recording on the recording layer L0 is completed, but prior to the start of recording on the recording layer L1, a test recording is conducted using the outer PCA 87 of the recording layer L0 to re-calibrate the write power of the laser. Subsequently, user data is written to the data recordable area 89 of the recording layer L1 using a write power appropriately calibrated for the recording layer L1. In the case of low-speed recording at 1× or 2× on the recording layer L1, test recording can be conducted in the inner PCA 92, but in the case of high-speed recording at 4× or higher, it is preferable to use the outer PCA 87. Moreover, the outer PCA 87 may be used even in the case of low-speed recording at 1× or 2×.

Furthermore, in FIG. 9 and FIG. 10, the hatched areas designate unrecorded areas, where no data has been recorded. In addition, the areas indicated by the symbol X in the recording layer L1 are buffer areas provided in consideration of the influence exerted by the recording layer L0. In other words, in FIG. 9 and FIG. 10, buffer areas are provided, respectively, at both ends of the RMA 91, both ends of the data recordable area 89, and the innermost periphery of the inner PCA 92, and if data is written onto the recording layer L0 located directly underneath, there is a chance that the intensity of the laser light during recording may be weakened and the recording conditions may change, which is why it is preferable to avoid recording data in these buffer areas. In addition, in FIG. 9 and FIG. 10, the areas of the recording layers L0 and L1 indicated by the symbol Y are as described in detail below; these are buffer areas used to ensure that test recording areas in the inner PCA and outer PCA of the recording layer L0 and test recording areas in the inner PCA and outer PCA of the recording layer L1 do not mutually overlap in the direction normal to the recording surface of the optical disk. Furthermore, it is not a problem if the buffer areas are not provided.

Figure 12:
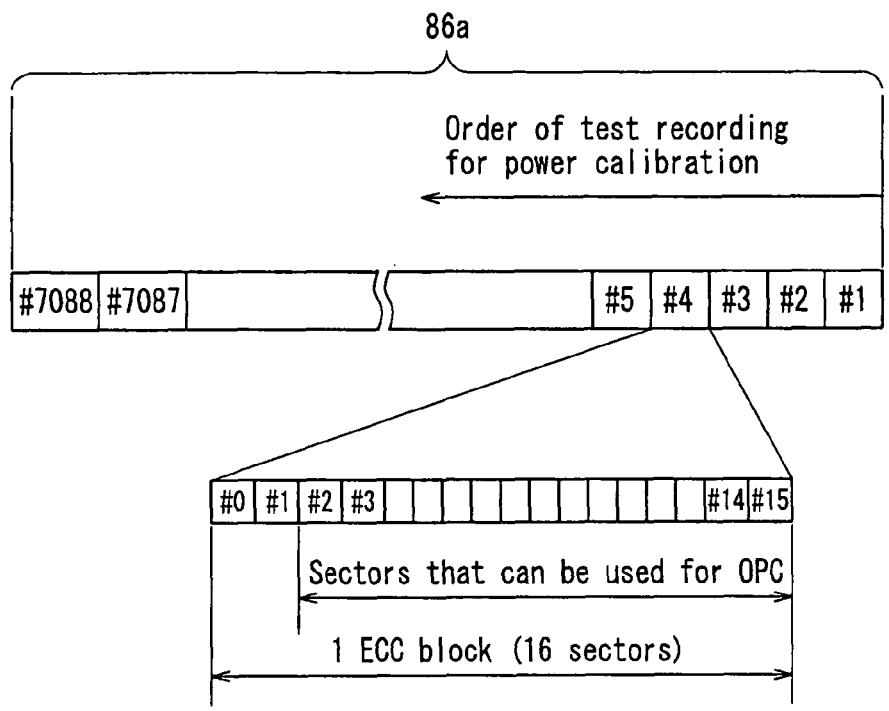
FIG. 12 is a sectional schematic view illustrating a PCA structure in an information recording medium according to a second embodiment of the present invention.
Figure 13:
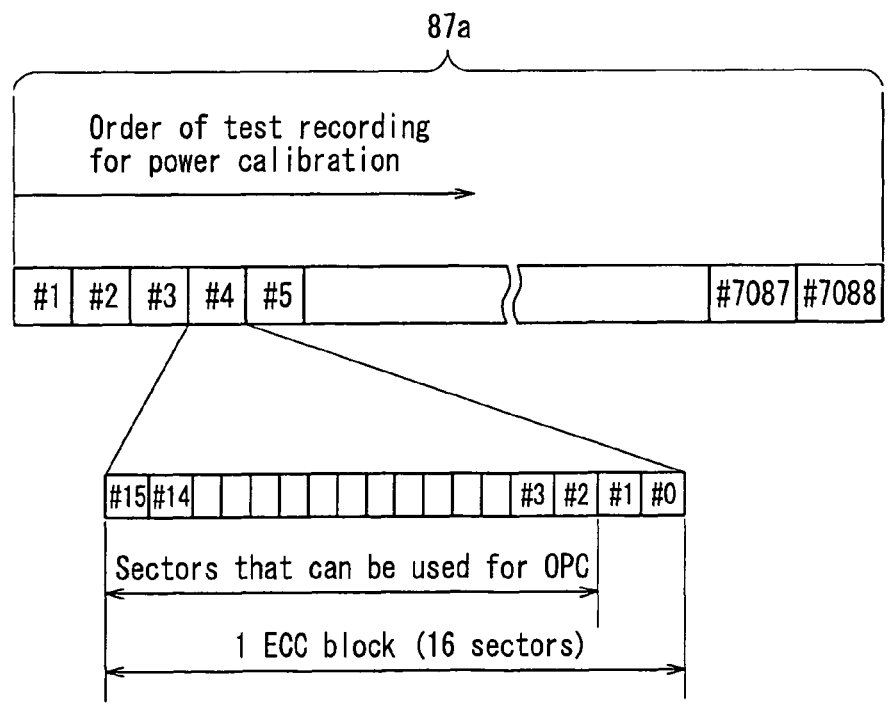
FIG. 13 is a sectional schematic view illustrating a PCA structure in an information recording medium according to a second embodiment of the present invention.

Here, explanations regarding the internal configuration of the outer PCAs 86 and 87 are provided with reference to FIG. 12 and FIG. 13. Furthermore, the internal configuration of the outer PCAs 86 and 87 is the same for the case illustrated in FIG. 9 and for the case illustrated in FIG. 10.

As shown in FIG. 12, a test recording execution area 86a made up of 7088 test recording fields (#1~#7088) is located in the outer PCA 86 of the recording layer L0. 1 ECC block (16 sectors) of data can be written to each test recording field for power calibration purposes. In FIG. 12, the inner periphery is on the left-hand side, and the outer periphery is on the right-hand side. Also, test recording in the outer PCA 86 is carried out starting from test recording fields on the outer periphery of the outer PCA 86 towards the inner periphery, in other words, by successively going through test recording fields #1, #2, #3 . . . . As shown in FIG. 12, test recording in each of the test recording fields is carried out along the direction of the tracks in the recording layer L0 (from the inner periphery to the outer periphery). Namely, test recording is carried out successively from the inner periphery to the outer periphery in a maximum of 14 sectors, with the exception of the first (#0) and second (#1) sector at the inner periphery, among the 16 sectors (#0~#15) in each test recording field.

On the other hand, as shown in FIG. 13, a test recording execution area made up of 7088 test recording fields (#1~#7088) is located in the outer PCA 87 of the recording layer L1. A single ECC block (16 sectors) of data can be written to each test recording field for power calibration purposes. In FIG. 13, the inner periphery is on the left-hand side, and the outer periphery is on the right-hand side. Also, unlike in the outer PCA 86 of the recording layer L0, test recording in the outer PCA 87 is carried out starting from the inner periphery of the optical disk 40 toward the outer periphery, by successively going through test recording fields #1, #2, #3 . . . As shown in FIG. 13, test recording in each of the test recording fields is carried out along the direction of the tracks in the recording layer L1 (from the outer periphery to the inner periphery). Namely, test recording is carried out successively from the outer periphery to the inner periphery in a maximum of 14 sectors, with the exception of the first (#0) and second (#1) sector at the outer periphery, among the 16 sectors (#0~#15) in each test recording field.

Furthermore, as shown in FIG. 9 and FIG. 10, the test recording execution area 86a of the outer PCA 86 of the recording layer L0 and the test recording execution area 87a of the outer PCA 87 of the recording layer L1 are arranged such that they do not mutually overlap in the direction normal to the disk surface of the optical disk 40. In addition, in addition to the test recording execution area 86a, the outer PCA of the recording layer L0 has another area, 86b, which is left in an unrecorded state. This is done for the following reasons. Namely, if certain data is recorded as a test pattern in the area 86b of the recording layer L0, then during test recording on the recording layer L1 directly above it, the transmittance of laser light changes depending on the test pattern recorded in the test recording execution area 86b. In other words, the effective power of the recording layer L1 fluctuates depending on the recording state of the recording layer L0, which makes accurate power calibration difficult. It is also possible to use the area 86b as the test recording execution area of the recording layer L0 and area 87b as the test recording execution area of the recording layer L1.

Furthermore, although the explanations provided above described the structure of the outer PCAs 86 and 87, since the inner PCA 81 and 92 have the same structure as the outer PCAs 86 and 87, a detailed explanation thereof, including drawings, is omitted. Test recordings are performed in the inner PCA 81 of the recording layer L0 starting from the test recording fields at the outer periphery, in the same manner as with the outer PCA 86, but the order of recording in the sectors of each test recording field corresponds to the direction of the tracks on the recording layer L0, in other words, it is directed from the inner periphery to the outer periphery. Test recordings are performed in the inner PCA 92 of the recording layer L1 starting from the test recording fields at the inner periphery, in the same manner as with the outer PCA 87, but the order of recording in the sectors of each test recording field corresponds to the direction of the tracks on the recording layer L1, in other words, it is directed from the outer periphery to the inner periphery. In addition, in the inner PCA 81 and inner PCA 92, the respective test recording execution areas are also arranged such that they do not mutually overlap in the direction normal to the disk surface of the optical disk 40.

When data is written onto the optical disk 40 having the above configuration, in the same manner as in the first embodiment, the optical disk recording and reproducing device preferably calibrates the write power of the laser by performing a test recording using the inner PCAs 81 and 91 when recording is performed at a relatively low speed (e.g., 1× or 2×) and outer PCAs 86 and 87 when recording is performed at a relatively high speed (e.g., 2× or higher)

Figure 8C:
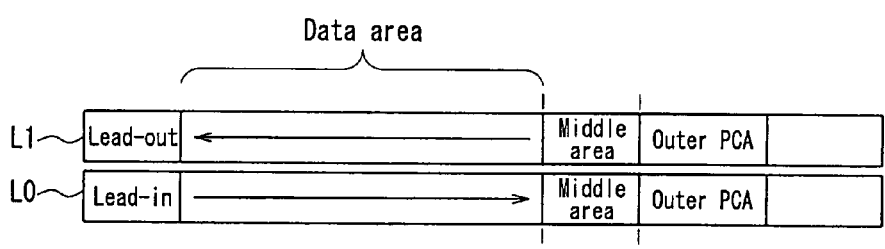
FIG. 8C is a schematic diagram illustrating an example of a writing mode used for an information recording medium according to a second embodiment of the present invention.
Figure 8D:
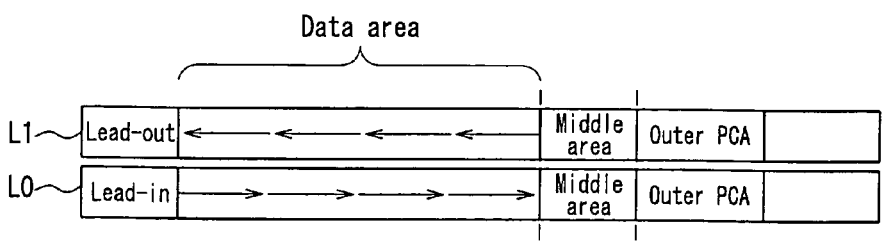
FIG. 8D is a schematic diagram illustrating an example of a writing mode used for an information recording medium according to a second embodiment of the present invention.
Figure 8E:
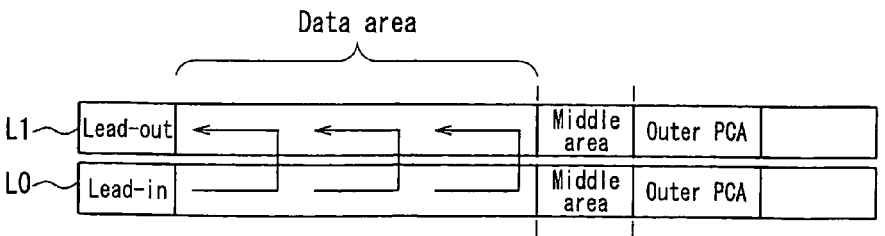
FIG. 8E is a schematic diagram illustrating an example of a writing mode used for an information recording medium according to a second embodiment of the present invention.

In addition, when, as shown in FIG. 10, the outer PCA 86 and middle area 85 of the recording layer L0, as well as the outer PCA 87 and middle area 88 of the recording layer L1, are shifted towards the inner periphery using the write methods illustrated in FIG. 8C, FIG. 8D, and FIG. 8E, the final address (last address) of the user data is written by the optical disk recording and reproducing device to the RMD in the RMAs 82 and 91 The area, where the last address is recorded, corresponds to BP (byte positions) #25~#27 illustrated in FIG. 2B~E in the first embodiment. However, since BP #25~#27 is an area where last addresses are recorded in single-layer DVD-Rs, the potential for confusion is lessened if the area used for recording last addresses in a two-layer configuration is different from the area used for recording last addresses in a single-layer configuration. Since positions up to BP#125 constitute an area used for recording copy pre-pit information in single-layer configurations, as shown in FIG. 2D~E, the new BPs used for recording last addresses in a two-layer configuration may be BPs spaced away from BP#125, with an interval of several bytes therebetween, e.g. BPs up to BP#127 may be used as a reserve, and the last addresses of the two-layer configuration may be allocated to BP #128~#131.

Figure 14A:
FIG. 14 is a conceptual diagram of RMD fields according to a second embodiment of the present invention.
Figure 14B:
Figure 14C:
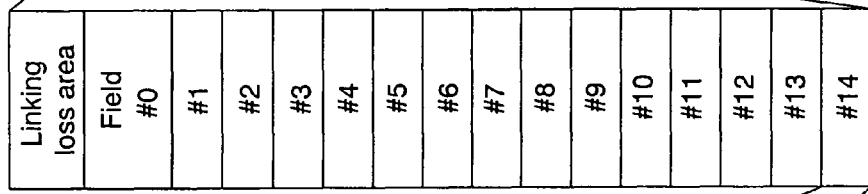

Furthermore, when the outer PCA 86 of the recording layer L0 and the outer PCA 87 of the recording layer L1 are shifted towards the inner periphery and a test recording is carried out, information representing the fact that the outer PCAs 86 and 87 have been shifted towards the inner periphery is recorded in the RMAs 82 and 91 of the optical disk 40 by the optical disk recording and reproducing device. For example, as shown in FIG. 14, when the outer PCA 86 of the recording layer L0 is shifted towards the inner periphery and a test recording is carried out, a flag in field#14 of the RMD contained in the RMA 82 of the recording layer L0, which indicates whether a shifted outer PCA 86 is used, is set to a value that represents "use". For example, when the outer PCA 86 is shifted, BP0 is assigned a value of 0001b, and if it is not, a value of 0000b.

As described above, due to the fact that outer PCAs are provided in each of the plurality of layers of the optical disk 40 of the present embodiment, a test recording using a particular recording speed etc. can be performed in the outer PCA of the recording layer at the time of recording on each recording layer.

In addition, as shown in FIG. 10, when the outer PCA 86 and middle area 85 of the recording layer L0, as well as the outer PCA 87 and middle area 88 of the recording layer L1, are shifted towards the inner periphery using the write methods illustrated in FIG. 8C, FIG. 8D, and FIG. 8E, processing involving writing dummy data to the unrecorded area of the data recordable area is rendered unnecessary, thereby enabling a reduction in the time required for finalization processing. The resulting advantage is that user data recording can be completed within a shorter period of time.

Furthermore, in the present embodiment, the inner PCA and outer PCA of each recording layer were used appropriately depending on the recording speed, and, as described in the first embodiment, even at low-speed recording, write power correction in accordance with the recording sensitivity differences generated at the inner and outer periphery of the disk is made possible by performing test recording both in the inner PCA and outer PCA. In addition, as described in the first embodiment, it is also preferable to copy test recording patterns of the inner PCA and outer PCA of the same recording layer in respectively the other's area in order to provide for cases of disk surface damage and contamination. Furthermore, the RMAs, where outer PCA-related management information is recorded, may also be provided at the outer periphery and, in such a case, it is also more preferable to copy the information contained in the inner RMA and outer RMA in respectively the other's area.

Furthermore, while the present embodiment provides an example of an optical disk 40 with a single-side dual-layer structure, the present invention is clearly applicable to optical disks with three or more layers. In addition, the present invention is applicable to disks made by bonding two multi-layered optical disks together.

In addition, while in all of the above embodiments, the explanations were focused on DVD-Rs, i.e. write-once optical disks, the outer PCA and/or outer RMA of the present invention are also applicable to phase-change type optical disks. However, erasing recorded user data in the data recordable area and overwriting it by recording other user data on top of the recorded user data (in other words, erasing the recorded user data and writing other user data on top of it) are functions of re-writable optical disks that are unavailable with write-once optical disks. During such erasure or overwriting, the erasure or overwriting of user data can be ensured by erasing or overwriting outer periphery recording management information and/or outer periphery test recording patterns related to the user data subject to the erasure or overwriting. In addition, the capacity of the recording areas used for the outer periphery test recording patterns and outer periphery recording management information (for example, 200 ECC in case of a PCA) can be efficiently utilized. Furthermore, when an outer PCA is shifted towards the inner periphery, the entire outer PCA may be erased and overwritten at the time of re-recording user data.

FIG. 15 and FIG. 16 illustrate physical formatting used when an area for recording RMD (RMA 321) is provided at the outer periphery as well. In the same manner as in the configuration of the inner RMA 102 explained in FIG. 2, as shown in FIG. 16, in case of the outer RMA 321, the RMA 321 is made up of 701 ECC blocks. In other words, a single ECC block is allocated to each piece of RMD. Each ECC block contains 16 sectors. In the sectors, fields are numbered #0 through #14, with OPC-related information stored in the second field, #1. The term "OPC-related information" refers, for instance, to information such as the drive's Manufacture ID, serial number, write power, write strategy code, etc.

As shown in FIG. 16F, the second field, #1, stores information on recording conditions during the recording of a title T1 at byte positions BP #0~#127. In addition, information on recording conditions during the recording of title T2 is stored at BP #128~#255 and information on recording conditions during the recording of title T3 is stored at BP #256~#383.

Figure 15A:
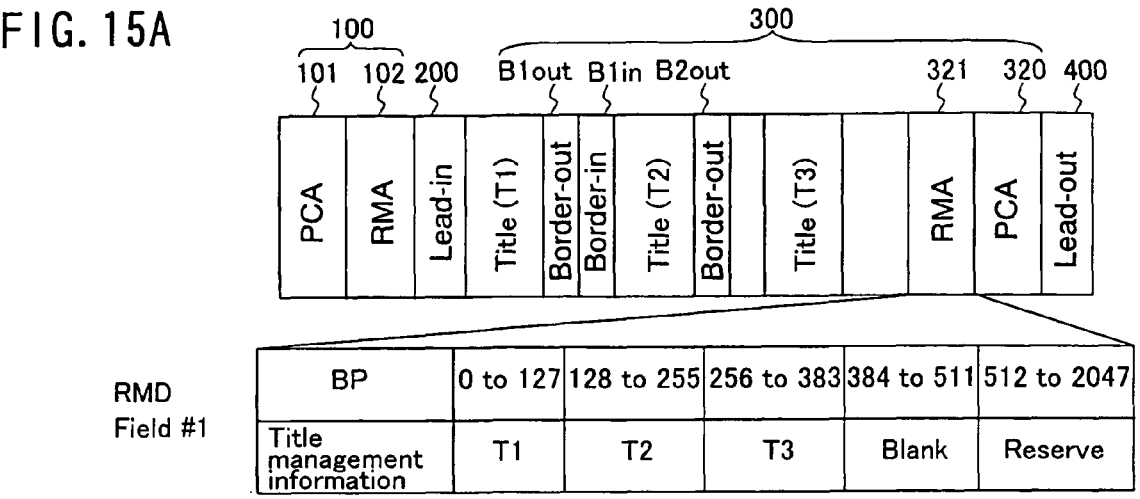
FIG. 15A is a diagram that explains the operation of erasing RMD information from the outer RMA during erasure of contents and showing a pre-erasure state.
Figure 15B:
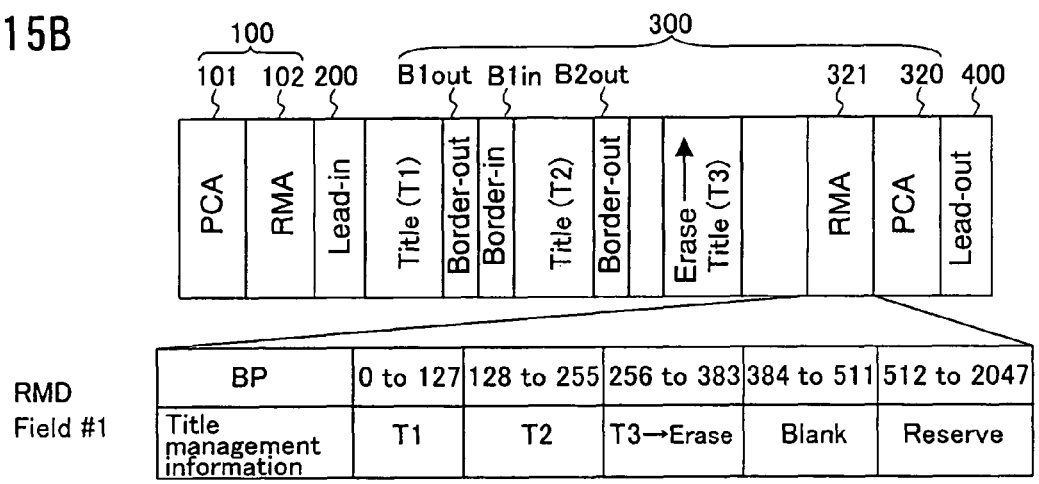
FIG. 15B is a diagram explaining the operation of erasing RMD information from the outer RMA during erasure of contents and showing a state, in which a title has been erased.
Figure 15C:
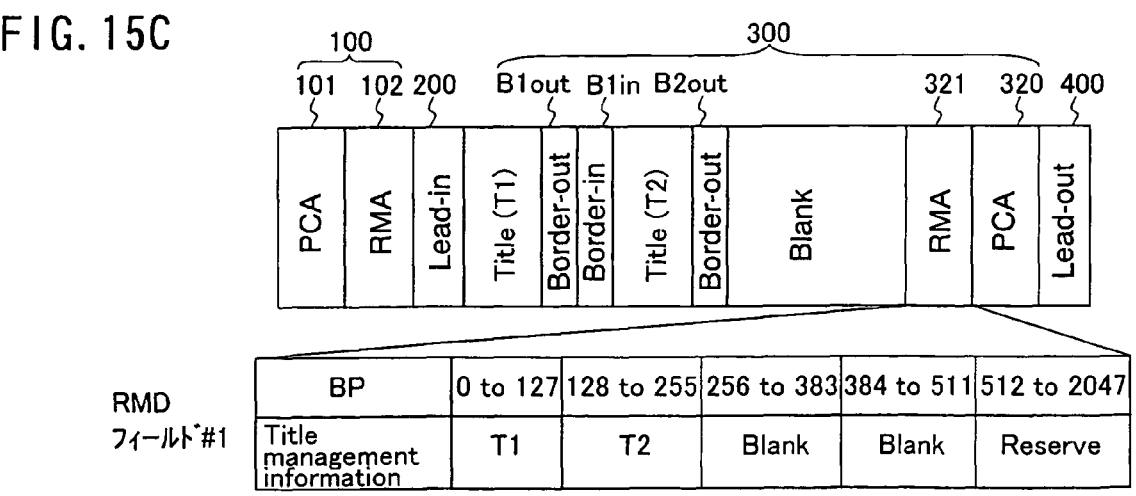
FIG. 15C is a diagram explaining the operation of erasing RMD information from the outer RMA during erasure of contents and showing a state, in which RMD information has been erased.
Figure 17:
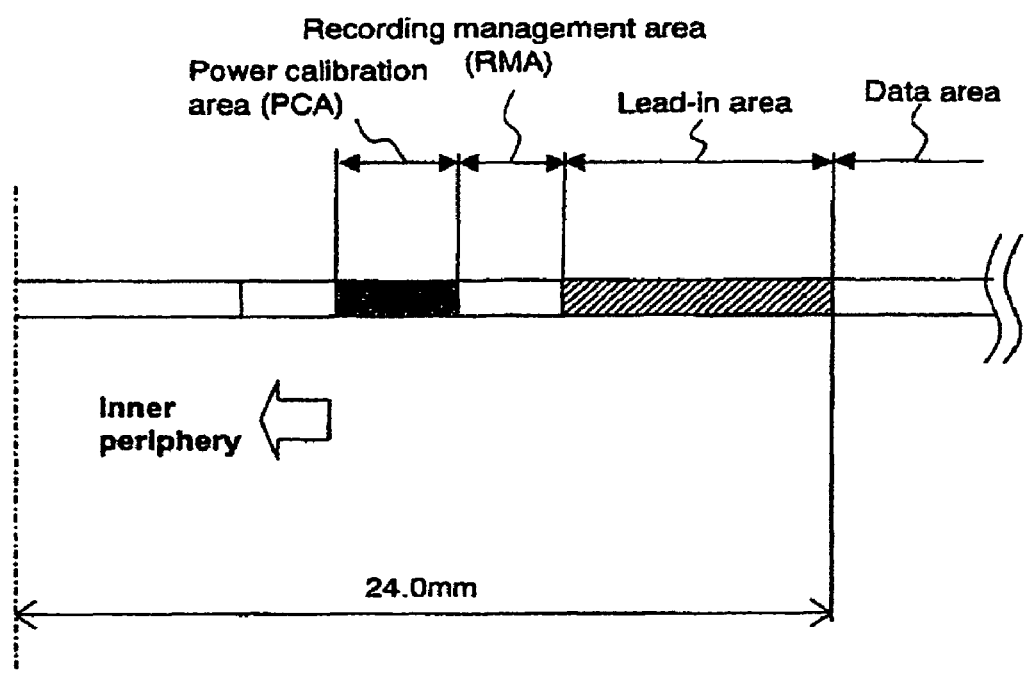
FIG. 17 is a conceptual diagram of an inner PCA in a conventional DVD-R.
Figure 18:
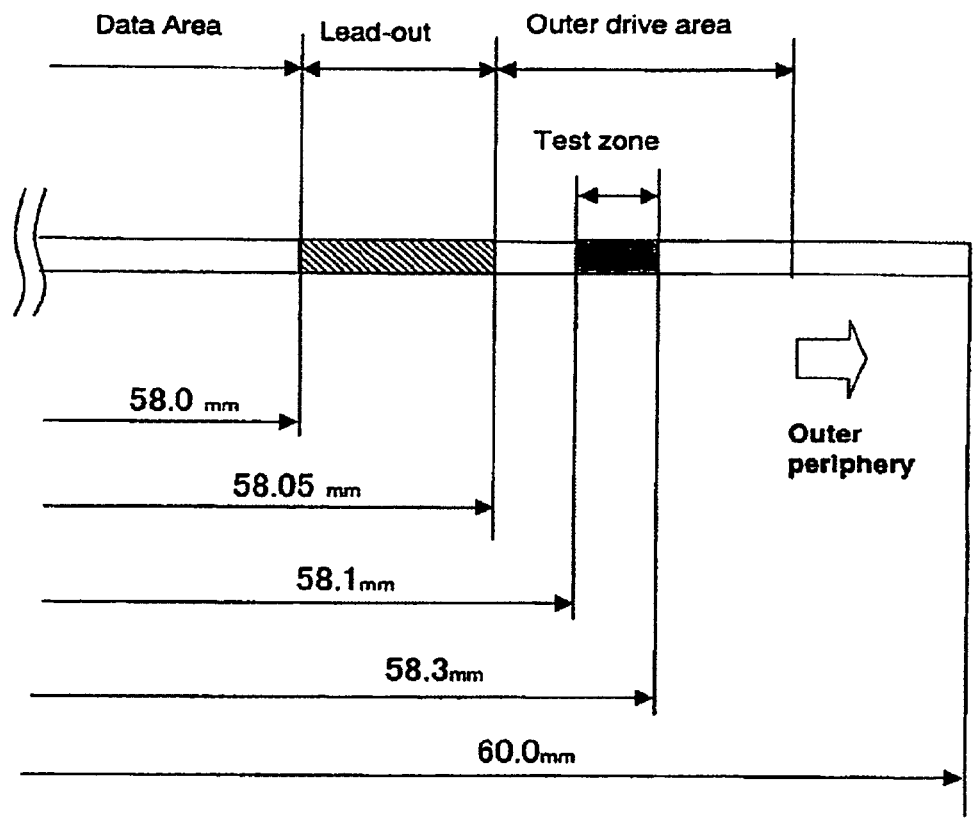
FIG. 18 is a conceptual diagram of an outer PCA in a conventional DVD+RW.

FIG. 15A~FIG. 15C illustrate the operation of erasing the contents of title T3, i.e. user data. After erasing the contents of the title T3 in accordance with the user's instructions, the recording and reproducing device also erases RMD information BP#256~#383, i.e. recording management information corresponding to recording T3.

FIG. 15B illustrates the state after erasure of the contents of title T3. As shown in FIG. 15B and FIG. 15C, when the unwanted contents of title T3 are erased, the recording and reproducing device also erases the recording management information of title T3, thereby increasing the volume allocated to user data and free space in the RMA 321 and enabling efficient use of the RMA 321.

Furthermore, while the examples explained above described erasing the contents and erasing RMD information corresponding to the contents in the RMA 321, in the same manner, the erasure of the corresponding RMD information may be performed with respect to the contents of the inner RMA 102.

In addition, while the present embodiment described only erasing RMD information, the same effects can be obtained by erasing test recording patterns corresponding to the contents of the PCA 320, where outer periphery test recording patterns are stored.

Industrial Applicability

The present invention is applicable to recording and reproducing devices using DVD-R, DVD-RAM, DVD-RW, VD+R, DVD+RW and other writable DVDs or Blue Ray disks used with a blue laser, AOD, and other optical disks for recording at high speeds.

The invention claimed is:

1. An information recording medium having one or more recording layers including a data recordable area for recording user information signals, a lead-in area provided on an inner periphery of the data recordable area, an inner power calibration area provided further on the inside of the lead-in area for recording test recording patterns, a read end data area, and a recording management area for recording recording management information related to the inner power calibration area,
wherein an outer power calibration area is provided in the data recordable area, with an outermost point of recorded user information on the one or more recording layers being on the inner periphery side relative to the outer power calibration area,
wherein address information of a point defining an outer boundary for recording additional user information in the data recordable area is in the record management area, with said outer boundary for recording additional user information being inward of the outer power calibration area,
wherein the read end data area is provided between the outer boundary for recording additional user information and an inner boundary of the outer power calibration area, and
wherein a starting position of recording in the outer power calibration area is determined based on the address information.

2. The information recording medium according to claim 1, wherein:
the one or more recording layers further includes a lead-out area.

3. The information recording medium according to claim 1, wherein:
a plurality of recording layers are present,
recording of a user information signal on one recording layer out of two adjacently stacked recording layers among the plurality of recording layers is performed from the inner periphery to the outer periphery of the information recording medium and recording of a user information signal on the other recording layer of the two recording layers is performed from the outer periphery to the inner periphery of the information recording medium, and
in the one recording layer, the outer power calibration area is provided on the outer periphery of the final point of recording of the user information signal, and
in the other recording layer, the outer power calibration area is provided on the outer periphery of the starting point of recording of the user information signal.

4. The information recording medium according to claim 3, wherein
in an nth inner power calibration area, an (n+1)th inner power calibration area, an nth outer power calibration area, and an (n+1)th outer power calibration area provided, respectively, on an adjacently stacked nth recording layer and (n+1)th recording layer, test recording execution areas provided in the respective power calibration areas are provided such that they don't mutually overlap in the direction of stacking of the recording layers.

5. The information recording medium according to claim 3, wherein
the direction of test recording performed for power calibration in the inner power calibration area and in the outer power calibration area is opposite to the direction of recording of the user information signal on the one recording layer.

6. The information recording medium according to claim 3, wherein an nth outer power calibration area and an (n+1)th outer power calibration area are provided, respectively, in an adjacently stacked nth recording layer and (n+1)th recording layer, with an nth middle area provided on the inner periphery of the nth outer power calibration area in the nth recording layer, and an (n+1)th middle area provided on the inner periphery of the (n+1)th outer power calibration area in the (n+1)th recording layer.

7. The information recording medium according to claim 6 wherein
in each adjacently stacked nth recording layer and (n+1)th recording layer, the nth middle area and the (n+1)th middle area, as well as the nth power calibration area and the (n+1)th power calibration area, are arranged by shifting them, in their entirety, towards the inner periphery, such that at least a portion of the nth middle area and the (n+1)th middle area, as well as the nth power calibration area and the (n+1)th power calibration area, is positioned on the inside of the outermost location that permits recording user information signals.

8. An information recording and reproducing device for recording desired user information signals in the data recordable area of the information recording medium according to claim 3, comprising:
a rotary drive unit that rotates the information recording medium,
an optical pickup that performs information signal recording or information signal reproduction on a recording layer by irradiating any of the recording layers among the plurality of recording layers provided in the information recording medium with light, and
and a calibration control unit that performs calibration of irradiation power using the optical pickup by moving the optical pickup at least to either one of the inner and outer power calibration areas of the information recording medium on the recording layer where one intends to perform recording or reproduction of an information signal.

9. The information recording medium according to claim 1, wherein the outer power calibration area is provided in a circular fashion at a distance of at least 0.2 mm on the outside from the outermost recordable location in the data recordable area.

10. The information recording medium according to claim 1, wherein recording management information related to the outer power calibration area also is recorded in the recording management area.

11. The information recording medium according to claim 1, wherein an outer recording management area used for recording recording management information related to the outer power calibration area is provided on the outside of the data recordable area.

12. The information recording medium according to claim 1, wherein a test recording pattern is recorded in the outer power calibration area when the data recording speed in the data recordable area is a predetermined speed or higher.

13. The information recording medium according to claim 1, wherein a test recording pattern is recorded in the outer power calibration area when the data recording speed in the data recordable area exceeds the recording speed at which recording was performed in the data recordable area in the past.

14. An information recording and reproducing device for recording desired user information signals in the data recordable area of the information recording medium according to claim 1, comprising:
- a rotary drive unit that rotates the information medium,
- an optical pickup that performs information signal recording or information signal reproduction by irradiating the information recording medium with light, and
- a calibration control unit that performs calibration of irradiation power using the optical pickup by moving the optical pickup at least to either one of the inner and outer power calibration areas of the information recording medium.

15. The information recording and reproducing device according to claim 14, further comprising a rotation control unit that controls the speed of rotation of the information recording medium by the rotary drive unit,
- wherein the calibration control unit acquires information on the rotational speed of the information recording medium from the rotation control unit and, depending on the acquired rotational speed information, and determines in which to perform calibration of the irradiation power using the optical pickup, whether the inner power calibration area or the outer power calibration areas.

16. The information recording and reproducing device according to claim 15, wherein the calibration control unit carries out irradiation power calibration using the optical pickup in the outer power calibration area when the speed represented by the rotational speed information exceeds a predetermined speed.

17. The information recording and reproducing device according to claim 14, further comprising means for copying the newest test recording pattern from among the test recording patterns stored in the inner power calibration area to the outer power calibration area whenever a recording operation begins.

18. The information recording and reproducing device according to claim 14, further comprising means for copying inner recording management information kept in an inner recording management area of the information medium to an outer recording management area of the information medium when recording a user information signal.

19. The information recording and reproducing device according to claim 14, further comprising means for erasing test recording patterns corresponding to the data to be erased among the test recording patterns recorded in the outer power calibration area when erasing data from the data recordable area.

20. The information recording and reproducing device according to claim 14, further comprising means for erasing recording management information corresponding to the data to be erased among the recording management information kept in an outer recording management area when erasing data from the data recordable area.

21. The information recording and reproducing device according to claim 14, wherein:
- information representing the extent of the writable area of the data recordable area is contained in the recording management area of the information recording medium, and
- the information recording and reproducing device further includes means for modifying the information representing the extent of the writable area of the data recordable area so as to move the outermost periphery of the writable area on the information recording medium towards the inner periphery.

22. The information recording medium according to claim 1, wherein the read end data area consists of only arbitrary data for differentiating between the outer boundary for recording additional user information and the inner boundary of the outer power calibration area.

* * * * *